United States Patent
Smitt

[11] Patent Number: 6,034,795
[45] Date of Patent: Mar. 7, 2000

[54] HIGH PRECISION COLOR SCANNER

[75] Inventor: Asbjorn Smitt, Alsgarde, Denmark

[73] Assignee: Contex A/S, Allerod, Denmark

[21] Appl. No.: 09/033,196

[22] Filed: Mar. 2, 1998

[51] Int. Cl.$^7$ .................................................. H04N 1/46
[52] U.S. Cl. ........................ 358/525; 382/318; 382/321
[58] Field of Search ............................ 358/525; 382/167, 382/321, 323, 324, 312, 318, 319

[56] References Cited

U.S. PATENT DOCUMENTS 5,336,878  8/1994  Boyd et al. .............................. 250/208
5,642,207  6/1997  Smitt ...................................... 358/474

*Primary Examiner*—Kimberly A. Williams
*Assistant Examiner*—Derrick Fields
*Attorney, Agent, or Firm*—Merchant & Gould P.C.

[57]  ABSTRACT

A variable resolution color scanner comprising multiple color line sensors arranged substantially in parallel and at a mutual distance. The scanner is capable of providing color components that are combined by means of delays and interpolators in order to form a high precision color representation of a scanned original. The color components are combined electronically such that at least one of the color components represent(s) an actually imaged line on the original, and such that the other color components represent estimated lines. Alternatively, the color components are combined electronically such that all other color components represent estimated lines.

32 Claims, 13 Drawing Sheets

| Time | Blue line signals | Green line signals | Red line signals |
|---|---|---|---|
| t=1 | BL(1) | | |
| t=2 | BL(2) | | |
| t=3 | BL(3) | | |
| t=4 | BL(4) | GL(1) | |
| t=5 | BL(5) | GL(2) | |
| t=6 | BL(6) | GL(3) | |
| t=7 | BL(7) | GL(4) | RL(1) |
| t=8 | BL(8) | GL(5) | RL(2) |
| t=9 | BL(9) | GL(6) | RL(3) |
| | | | |
| t=M-7 | BL(N-1) | GL(N-4) | RL(N-7) |
| t=M-6 | BL(N) | GL(N-3) | RL(N-6) |
| t=M-5 | | GL(N-2) | RL(N-5) |
| t=M-4 | | GL(N-1) | RL(N-4) |
| t=M-3 | | GL(N) | RL(N-3) |
| t=M-2 | | | RL(N-2) |
| t=M-1 | | | RL(N-1) |
| t=M | | | RL(N) |

Fig. 2

| Time | Blue line signals | Green line signals | Red line signals |
|---|---|---|---|
| t=1 | 0 | | |
| t=2 | | | |
| t=3 | | | |
| t=4 | | 0 | |
| t=5 | | | |
| t=6 | | | |
| t=7 | | | RL(1) |
| t=8 | BL(1) | GL(1) | RL(2) |
| t=9 | BL(2) | GL(2) | RL(3) |
| t=10 | BL(3) | GL(3) | RL(4) |
| t=11 | BL(4) | GL(4) | RL(5) |
| | | | |
| t=M-5 | BL(N-6) | GL(N-6) | RL(N-5) |
| t=M-4 | BL(N-5) | GL(N-5) | RL(N-4) |
| t=M-3 | BL(N-4) | GL(N-4) | RL(N-3) |
| t=M-2 | BL(N-3) | GL(N-3) | RL(N-2) |
| t=M-1 | BL(N-2) | GL(N-2) | RL(N-1) |
| t=M | BL(N-1) | GL(N-1) | RL(N) |
| t=M+1 | BL(N) | GL(N) | |

Fig. 5

| C=0 | ⇒ | D=A |
|---|---|---|
| C=1 | ⇒ | $D = {}^{15}/_{16}A + {}^{1}/_{16}B$ |
| C=2 | ⇒ | $D = {}^{14}/_{16}A + {}^{2}/_{16}B$ |
| ⋮ | | |
| C=15 | ⇒ | $D = {}^{1}/_{16}A + {}^{15}/_{16}B$ |
| C=16 | ⇒ | D=B |

HIGH PRECISION COLOR SCANNER

FIELD OF THE INVENTION

The present invention relates to an optical colour scanner with a variable line resolution.

BACKGROUND OF THE INVENTION

Optical scanners are capable of producing a representation of the image of an original by projecting an image of the original onto optical sensors by means of an optical system. The optical sensors thereby provide signals which represent the image of the original, or a part thereof, as intensity levels. In a colour scanner the image of the original is represented as intensity levels at a given number of colours. The colours, e.g. red, green, and blue, are colour components of a colour represention of the original. Typically the intensity levels are obtained by means of an optical sensor for each of the colour components and the image projected onto the respective optical sensors are filtered by means of respective colour filters. In fact a scanned colour is represented by a spectrum of monochromatic colour components. However, in the following the term colour is used for such a spectrum.

In a practical embodiment the optical sensors are provided as a line detector which comprises a colour line sensor for each colour component. But, due to the fact that each colour line sensor is capable of imaging only one scan line on the original, the original is moved past the line detector at a given feed rate in order to obtain an image of the entire original, that is the original is scanned. Alternatively the line detector may be moved past the original at a given feed rate.

Various types of photosensor devices may be used as colour line sensors, e.g. charge coupled devices (CCD's). A CCD builds up an electrical charge in response to the exposure to light. The magnitude of the electrical charge built up is dependent on the intensity and the duration of the light exposure. The intensity of a picture element (pixel) on the original is imaged by a CCD cell. Multiple CCD cells may be aligned in linear arrays, such that a scan line on the original or a segment of a scan line, comprising multiple pixels, is imaged by means of a CCD array. A line detector may thereby comprise a respective CCD array with a respective colour filter for each colour component in the colour representation. The CCD arrays with the respective colour filters are arranged in parallel and at a mutual distance.

The charge built up in each CCD is sampled and discharged at sampling intervals. Typically the CCD's are sampled at regular sampling intervals, i.e. at a constant sampling rate. Each sample represents the imaged intensity of a pixel for a given colour component.

Since the respective colour line sensors are arranged in parallel at a mutual distance and the image of the original is projected onto the colour line sensors by means of an optical system common for all the colour components, the colour line sensors do not image the same line on the original at a given point of time. That is, the different colour components do not represent the same and one single line, but lines on the original offset a number of scan lines relative to each other.

In order to achieve a representation of a line on the original with all the colour components, the signals from the colour line sensors can be combined electronically.

However, this electronical combination is often rather complex because the scan line offset between the different colour components is changed depending on how the scanner is operated. Often, it is desired to change the resolution of scanning, i.e. the number of pixels per unit area on the original, in order to reduce the amount of data if a coarse representation of the original can be accepted, and vice versa if a fine representation of the original is required, then a larger amount of data is the result. The vertical resolution, perpendicular to the line of scanning, may be changed by adjusting the feed rate, and since the CCD's are sampled at a constant sampling rate, the number of lines scanned is thereby changed, i.e. the number of pixels in a direction which is vertical or transversal to the lines is changed. This change in the vertical resolution of scanning results in a changed scan line offset between the different colour components.

U.S. Pat. No. 5,336,878 discloses a 'variable speed single pass color optical scanner'. This scanner is capable of providing a three-colour-representation at a desired line resolution by adjustment of the scanning speed, i.e. the feed rate. The scanner uses three colour line sensors arranged in parallel to detect the colour information and each colour line sensor provides a colour line signal at a sampling rate. According to the actual feed rate, the sampling rate, and the imaged line width on the original the colour line signals are correlated in steps of integer lines.

Thus, the misregistration of colour information may be one-half effective scan line width. Alternatively, the speed selector may be set to allow only certain steps of values of speed choice/scaling, in which case no colour registration error is induced.

However, it is often desired to be able to change the resolution of scanning continuously or at least in fine steps and at the same time avoid this misregistration of colour information.

U.S. Pat. No. 5,642,207 discloses a 'color scanner with variable line resolution' which is hereby specifically incorporated by reference in its entirety. This scanner is also capable of providing a three-colour-representation at a desired line resolution, but not by means of changing the feed rate. Instead, the original is scanned at a fixed feed rate, i.e. the number of scanned lines across the original is held fixed. According to a desired resolution, a number of new lines are calculated. These new lines are calculated by means of interpolation between the scanned lines when the number of scanned lines is not an integer multipla of the number of new lines.

This fixed feed rate solution is inexpedient because the scanner is not capable of speeding up the scanning process when a low or coarse resolution is sufficient. Further, when the number of scanned lines is not an integer multipla of the number of new lines, then all colour components of the colour representation are interpolated. This is a frequent situation when an original is scanned because most modern scanners allows for an adjustable resolution that can be continuous—or at least carried out in small steps—which resolution may be adapted specifically for the actual purpose of the scanning.

As stated above are all colour components of the colour representation interpolated, this interpolation will, all other things being equal, introduce an error into the colour representation of the original. If e.g. the common red, green, and blue colour representation is selected, then especially interpolation of the green colour will result in a significant degradation of the perception of sharpness because the green colour is related to the perception of sharpness in the human visual system.

So there exists a problem in the field of optical scanning with variable line resolution, that misregistration is present and that the combination of the contributions from the colour components introduces significant errors.

SUMMARY OF THE INVENTION

The primary object of the invention is to provide a variable resolution colour scanner which is capable of providing colour components and combining these colour components in order to achieve a high precision colour representation of a scanned original, and representing the colour information electronically such that at least one of the colour components represent an actually imaged line on the original, and such that the other colour components represent estimated lines.

There is provided an optical colour scanner with a line resolution, said scanner collecting information from an original, comprising: a line detector comprising a set of colour line sensors arranged substantially in parallel and with a mutual distance, said colour line sensors registering colour information from pixels on the original, thereby providing a colour signal for each colour line sensor which represents the registered colour information; alignment means connected to align said colour signals, thereby providing aligned colour signals; interpolation means adapted for calculating interpolated values in response to interpolation coefficients, thereby estimating colour information between the registered colour information from lines on the original; said interpolation coefficients being mutually adjusted such that said interpolated values are located at a position coincident with a registered pixel represented by means of a sample point.

The colour information of an original is thereby represented by means of colour components. Said colour information being composed of a colour component representing an exact scanned line and colour components representing estimates of scanned lines based on exact scanned lines. There is thereby obtained a high precision colour representation.

A second object of the invention is to provide a variable resolution colour scanner which is capable of providing colour components and combining these colour components such that colour components represent estimated lines which correspond to a freely chosen position between two scanned lines on the original.

There is provided an optical colour scanner with a line resolution, said scanner collecting information from an original, comprising: a line detector comprising a set of colour line sensors arranged substantially in parallel and at a mutual distance, said colour line sensors registering colour information from pixels on the original, thereby providing a colour signal for each colour line sensor which represents the registered colour information; displacement means, which is capable of displacing the original and said line detector relative to each other with a selectable feed rate; alignment means connected to align said colour signals individually, thereby providing aligned colour signals; interpolation means adapted for calculating interpolated values in response to interpolation coefficients, thereby estimating colour information between the registered colour information from lines on the original; said interpolation means being adapted, such that at least a first interpolation coefficient may be selected freely and such that at least a second interpolation coefficient may be adjusted in correspondence with the feed rate, in order to calculate interpolated values, for respective colours, which estimates colour information for coincident lines.

It is thus possible to scan a document with a fixed interpolation coefficient for one colour line signal and adjusting interpolation of the remaining colour line signals in correspondence with the feed rate.

BRIEF DESCRIPTION OF THE DRAWINGS

The invention will be explained more fully below in connection with preferred embodiments and with reference to the drawings, in which:

FIG. 2 shows colour line signals from the colour line sensors $CLS_R$, $CLS_G$, and $CLS_B$;

FIG. 5 shows the colour line signals in FIG. 2, after being integer aligned;

DETAILED DESCRIPTION OF THE PREFERRED EMBODIMENTS

Figure 1:
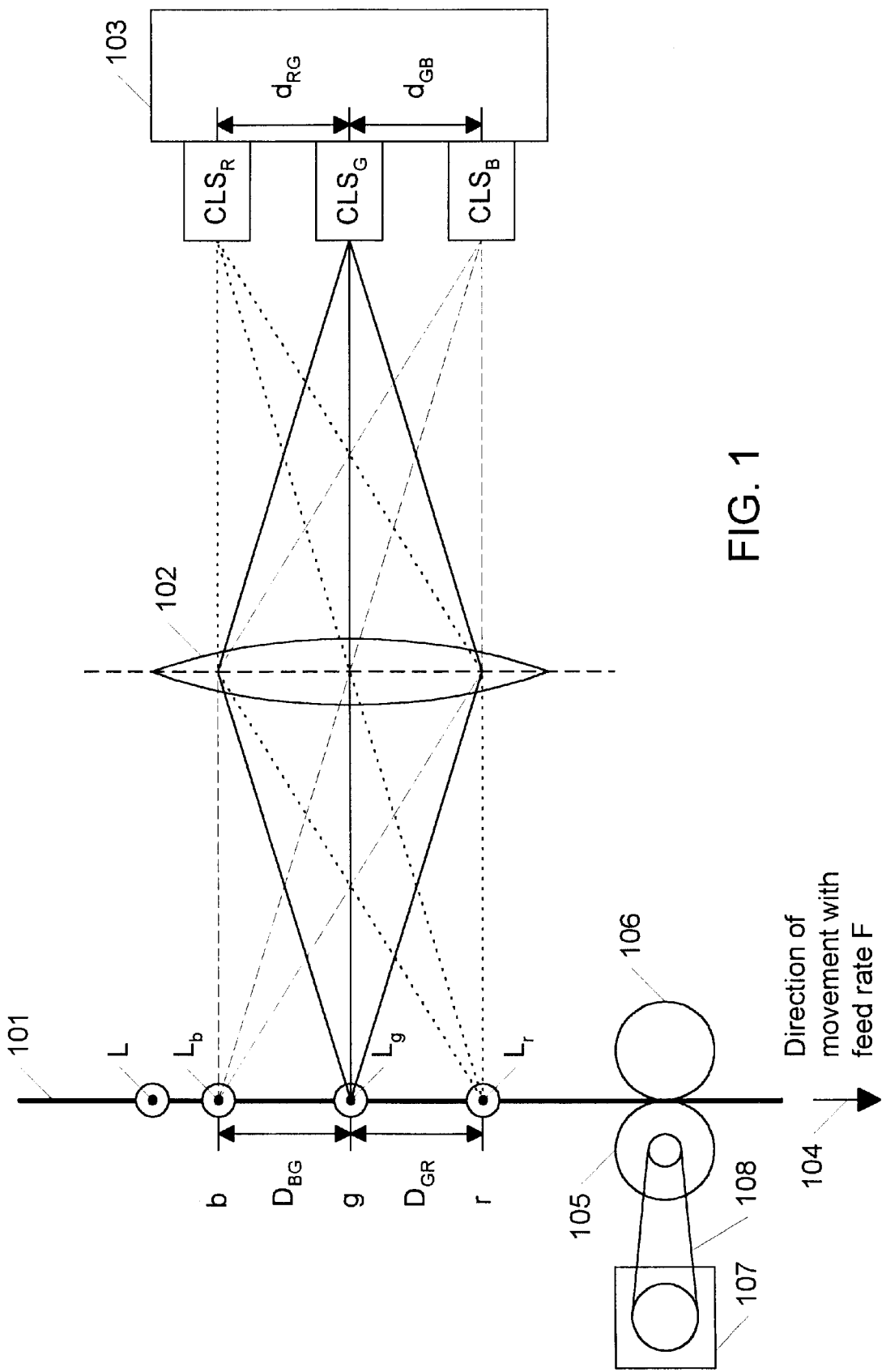
FIG. 1 shows a sectional view through a basic system for use in the colour scanning of an original.

FIG. 1 shows a sectional view through a basic system for use in the colour scanning of an original. An image of a scan line portion of an original 101 is projected onto the line detector 103 by means of the optical element 102. The optical element 102 is shown as a lens, but may be in the form of a lens bar or any other suitable optical element. In order to scan the original by means of a single line detector 103, the original is moved past the optical element in the direction indicated by the arrow 104 at a velocity or feed rate F [m/sec]. In this embodiment the original 101 is moved by means of displacement means comprising two rollers 105 and 106 driven by a motor 107 via a belt 108. The motor may be controlled by means of a controller (not shown) in response to a feed rate selected by a scanner operator. The position of the line detector is thereby held fixed. Alternatively, the line detector may be moved across the (fixed) original.

For practical purposes, it may be expedient to illuminate the original by means of a polychromatic light source in order to increase the intensity of the image projected onto the line detector 103.

A colour line L, on the original 101, having a direction perpendicular to the sectional view is located at a position b at a first point in time, and due to the movement of the original, the same line is located at a position g at a second point in time, and located at a position r at a third point in time. The three locations of the same line, at different points in time, are indicated as $L_b$, $L_g$, and $L_r$, respectively.

The line detector 103 has three colour line sensors $CLS_R$, $CLS_G$, and $CLS_B$, detecting red, green, and blue colour lines, respectively. The colour line sensors are arranged such that lines on the original 101 located transversely to the direction of movement are imaged. That is, the colour line sensors are arranged in parallel and at a distance $d_{RG}$ between the red and green colour line sensors $CLS_R$ and $CLS_G$, respectively and at a distance $d_{GB}$ between the green and blue colour line sensors $CLS_G$ and $CLS_B$, respectively.

According to the optical ray traces through the optical element 102 blue information is detected at position b by means of the colour line sensor $CLS_B$, green information is detected at position g by means of the colour line sensor $CLS_G$, and the red information is detected at position r by means of the colour line sensor $CLS_R$.

The colour line sensors are preferably CCD arrays having a respective colour filter, e.g. a blue, green, and red colour filter. The colour line sensors comprise a number of pixel elements, where each pixel element e.g. is 14 μm×14 μm. The line detector 3 may e.g. have three lines ($CLS_R$, $CLS_G$, and $CLS_B$) each comprising 5000 pixel elements.

If an optical resolution of 360 dpi is to be obtained by means of a CCD array comprising pixel elements with a size of 14 μm×14 μm, then each pixel element should image a 0.0028 inch×0.0028 inch pixel on the original, thus requiring an optical magnification M in the optical element 102 with a value of M=5,08. Since each of the colour line sensors $CLS_R$, $CLS_G$, and $CLS_B$ is positioned at the distance $d_{RG}$ and $d_{GB}$, e.g. 168 μm, from each other in the sensor plane, the lines registered by the individual colour sensors on the original in the original plane, via the optical element 102, will likewise be offset by $D_{BG}$ and $D_{GR}$ from each other. That is, if $d_{RG}=d_{GB}=168$ μm and $D_{GR}=Md_{RG}$ and $D_{BG}=Md_{GB}$, then $D_{GR}=D_{BG}=D=5,08\times168$ μm$=853,44$ μm. This result is used later.

It is possible to read a certain number of lines $N_L$ per second per colour from a colour line detector with a specific type of line detector and connected hardware. Note that if $N_L$ has a fractional part being different from zero, then this fraction corresponds to a fraction of a line not completely read. That is a number of pixels in the along lines direction. It is further possible to calculate a gap line number, $N_{GL}$, which is the distance between two adjacent colour line sensors, measured as a number of detectable lines for the actual feed rate F $$N_{GL}=(N_L D)/F$$

where $N_{GL}$ [lines] is the gap line number, F is the feed rate [m/sec], $N_L$ [lines/sec] is the number of lines read by a color line detector per second, and D is the mutual distance between two color line detectors measured in the original plane. Now, with the result D=853,44 μm from above, $N_L$ being equal to 100 lines per second, and the feed rate F=0,007112 m/sec, then the number of corresponding gap lines $N_{GL}$ is $N_{GL}=12$ lines. This information, contained in $N_{GL}$, may be used to combine the colour line contributions provided by the sensors $CLS_R$, $CLS_G$, and $CLS_B$, for a given line L, detected at different locations and at different points of time.

If a complete R, G, B colour scanning of a line L on the original is the object, and a gap line number of $N_{GL}=12$ lines is calculated, then the line L is scanned by the colour line sensor $CLS_B$ at the position b, the original is moved a distance of 12 gap lines in the direction of movement (while other lines are scanned), and L is scanned by the colour line sensor $CLS_G$ at the position g. Again, the original is moved a distance of 12 gap lines in the direction of movement (while other lines are scanned), and L is scanned by the colour line sensor $CLS_R$ at a position r. The line L is thereby scanned by the three color line sensors $CLS_R$, $CLS_G$, and $CLS_B$.

From the above it is clear that means connected to receive colour signals from each of the colour line sensors $CLS_R$, $CLS_G$, and $CLS_B$ in the line detector 103, must be capable of combining the colour signals in order to form a three-colour representation for a line on the original.

When the gap line number is an integer, this combination may be obtained by means of simple line delays as disclosed in U.S. Pat. No. 5,336,878, which is hereby specifically incorporated as a reference. However, when e.g. the feed rate F or any other parameter is changed the gap line number may be a non-integer number. This is the case, when the colour line sensors $CLS_R$, $CLS_G$, and $CLS_B$ are held at a fixed position relative to the optical element 102 and with a fixed distance to the original 101, and when the feed rate is adjustable. The feed rate may be adjustable in order to obtain a desired resolution of scanning, that is the number of scanned lines per unit length on the original is changed thereby changing what is denoted the vertical resolution, all other things being equal.

A non-integer gap line number (or adjustable feed rate) typically results in a degraded quality of colour scanning because a given line on a scanned original is not imaged by all three colour line sensors. However, according to the invention it is possible to combine colour line signals by use of a delay and an interpolator whereby a high colour precision is obtained even in case the gap line number is a non-integer. This will be explained more fully below.

Formally, when an original is scanned three sequences BL, GL, and RL are provided each respective sequence representing the blue, green, and red information of the scanned original. The sequences are composed of N respective colour line signals BL(nb), GL(ng), and RL(nr), where nb, ng, and nr are integers in the interval {1..N} and where each colour line signal represents a line on the scanned original. Each colour line signal is composed of P sample points, each sample point representing a scanned pixel on the original. A sample point p representing the red pixel information in a scanned line n is thus referred to as RL(n,p), where p is an integer in the interval {1..P}. In the following this definition will be used in the description of the invention.

FIG. 2 shows colour line signals from the colour line sensors $CLS_R$, $CLS_G$, and $CLS_B$ shown in FIG. 1 and corresponding to scanning of an original. Referring to FIG. 1, at a given time t=1 a line located at the position b is detected by means of the detector $CLS_B$, and there is provided a signal BL(1) representing the blue information of that line. Successively at time t=2, a line located one gap line next to that line, opposite to the direction of movement, is detected and a colour line signal BL(2) is provided. This continues until N lines with the colour line sensor $CLS_B$ are detected, thereby providing the sequence BL={BL(1), BL(2), ..., BL(N)}.

Meanwhile a sequence, starting at time t=4, is provided. A line located at the position g is detected by means of the detector $CLS_G$, and there is provided a signal GL(1) representing the green information of that line. Successively at time t=5, a line located one gap line next to that line, opposite to the direction of movement, is detected and a colour line signal GL(2) is provided. This continues until N lines with the colour line sensor $CLS_G$ are detected, thereby providing the sequence GL={GL(1), GL(2), ..., GL(N)}.

Likewise, and meanwhile a sequence, starting at time t=7, is provided. A line located at the position r is detected by means of the detector $CLS_R$, and there is provided a signal RL(1) representing the red information of that line. Successively at time t=8, a line located one gap line next to that line, opposite to the direction of movement, is detected and a colour line signal RL(2) is provided. This continues until N lines with the colour line sensor $CLS_R$ are detected, thereby providing the sequence RL={RL(1), RL(2), ..., L(N)}.

The example illustrated in the table in FIG. 2 corresponds to the scanning of an original at a feed rate that results in a gap line number which integer part is equal to three, i.e. round-down($N_{GL}$)=3. The sequence GL thus starts at time t=1+round-down($N_{GL}$)=4, and the sequence RL starts at time t=1+2×round-down($N_{GL}$)=7.

If the gap line number $N_{GL}$ is exactly equal to three, then the signals BL(1), GL(1), and RL(1) will represent exactly the same imaged line on the original and correspondingly BL(2), GL(2), and RL(2) will represent exactly the same imaged line etc. Likewise, for other integer gap line numbers, it is possible to image exactly the same line on the original and represent that line with three different colour line signals.

However, if the gap line number is a non-integer e.g. 3⁵⁄₁₆, then any three colour line signals of the three different colours will not be able to represent the colour information of a given and single line. That is, a line on the original cannot be represented in three colours with the information from three single colour line signals if a high colour precision is desired.

Figure 3:
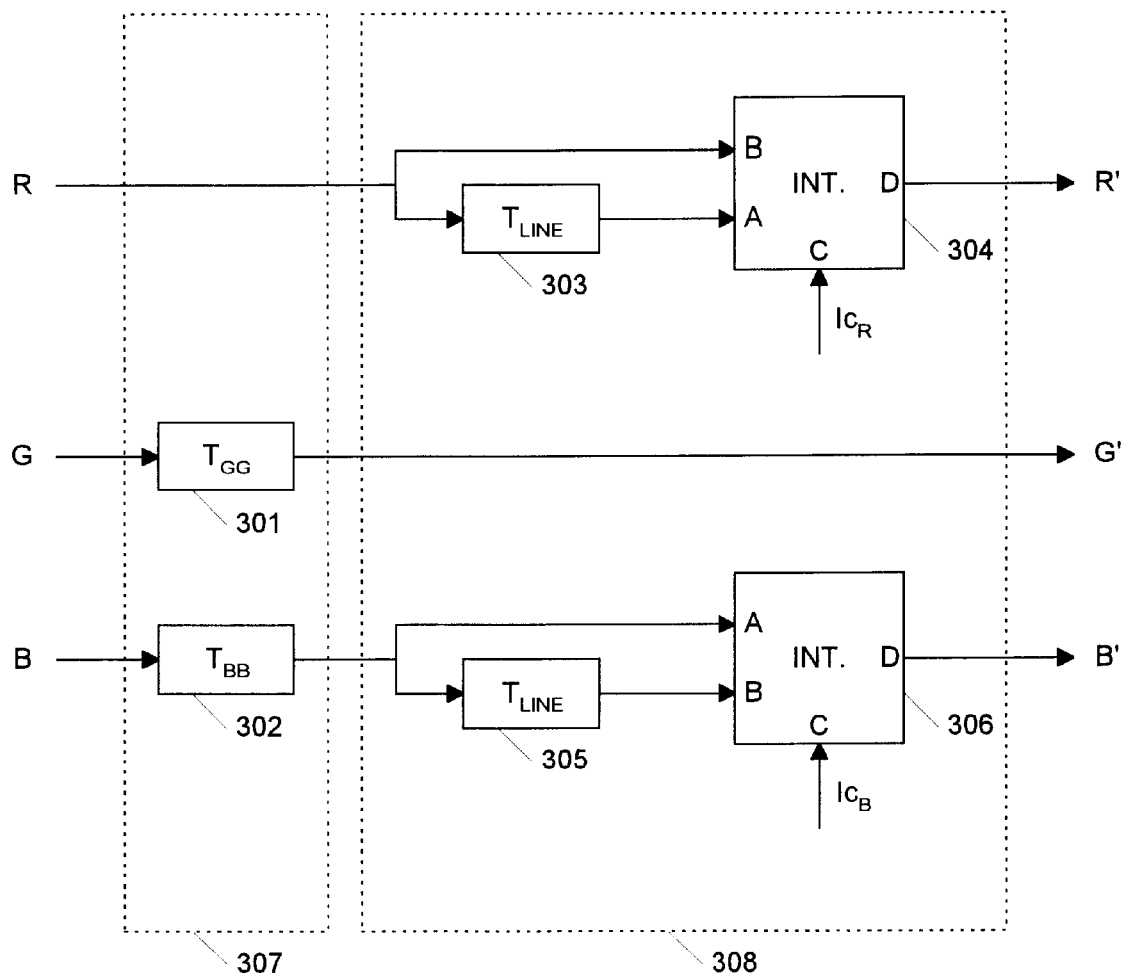
FIG. 3 shows three colour line signal paths, which are capable of combining colour line signals according to the invention.

FIG. 3 shows three colour line signal paths, which are capable of combining the colour line signals according to the invention. In order to represent the colour information of a pixel on a scanned original with a high precision three colour representation, and according to the invention, three colour line signals must be combined without interpolating at least one of the colour line signals. Subsequently the other colour line signals are estimated with respect to the non-interpolated colour line signals. Preferably the green colour line signals are decided to remain uninterpolated thereby representing an actual scanned line with GL(n), n being an integer in the interval {1..N} i.e. a scanned lines index. This is expedient, because the green colour, is in the human visual system, related to perception of contrast and sharpness of a viewed object. The visual quality experienced is thereby enhanced. The following provides a description of an embodiment where the green colour line signals are not interpolated.

The inputs R, G, and B are connected to receive signals from the colour line sensors $CLS_B$, $CLS_G$, and $CLS_R$, respectively. The signals from the colour line sensors are received according to a schedule where the blue signals start to arrive at a first point of time, the green signals start to arrive at a second point in time corresponding to a delay of an integer number of gap lines, and the red signals start to arrive at a third point of time corresponding to an integer number of gap lines later than the second point in time. This schedule is shown by way of example in FIG. 2.

The embodiment shown in FIG. 3 comprises an interpolator 304 and a line delay 303 in the signal path receiving the red colour line signals via input R, an integer line delay 301 in the signal path receiving the green colour line signals via input G, and an integer line delay 302, an interpolator 306, and a line delay 305 in the signal path receiving the blue colour line signals via input B.

According to the definition of the signals provided by the colour line sensors the signals arriving at input R arrive as a sequence $S_R$ of sample points $$S_R = RL(1,1)..RL(1/P), RL(2,1)..RL(2,P)..RL(N,1)..RL(N, P)$$

where N is the number of scanned lines imaged by the colour line sensor $CLS_R$, and P is the number of imaged pixels or sample points in a line.

The line delay 303 may be a FIFO (first-in-first-out) memory type which has a one line storage capacity corresponding to P sample points. Thus, when the first sample point RL(3,1) from scanned line number three arrives at the input R, then the first sample point RL(2,1) from line number two is provided as an output from the line delay 303. The sample points input to the B and A input of the interpolator 304 is thereby RL(3,1) and RL(2,1), respectively. When the next sample point RL(3,2) of line number three arrives at the input R, then then the next sample point RL(2,2) from line number two is provided as an output from the line delay 303, and these signals are input to the B and A input of the interpolator 304, respectively. This continues until the entire sequence $S_R$ of sample points is processed.

The interpolator 304 is thereby able to interpolate new points representing pixel values between two sample points in two adjacent scanned lines scanned with the colour line sensor $CLS_R$. The interpolator 304 may implement the linear interpolation function, $$D = (A(1-C)+CB)$$

where D is a new point, B is the not-delayed contribution from the sequence $S_R$, and A is the one-line delayed contribution from the sequence $S_R$. C is an input onto which an interpolation coefficient $Ic_R$ may be applied. $Ic_R$ may be adjusted according to the fractional part of the gap line number. The sequence of interpolated points is provided as a signal at the output R'.

Correspondingly a sequence $S_G$ of sample points arrives at the input G $$S_G = GL(1,1)..GL(1,P), GL(2,1)..GL(2,P)..GL(N,1)..GL(N,P)$$

where N is the number of scanned lines imaged by the colour line sensor $CLS_G$, and P is the number of imaged pixels or sample points in a line.

The signal provided at the output G' is identical to the input signal delayed $T_{GG}$ lines, where $T_{GG}$ is equal to the integer part of the gap line number $N_{GL}$ plus one, i.e. $T_{GG}=1+$round-down($N_{GL}$). This output signal is thereby not interpolated.

Input B is the input to the signal path processing the signals from the colour line sensor $CLS_B$. A sequence $S_B$ of sample points arrives at the input B $$S_B = BL(1,1)..BL(1,P), BL(2,1)..BL(2,P)..BL(N,1)..BL(N,P)$$

where N is the number of scanned lines imaged by the colour line sensor $CLS_B$, and P is the number of imaged pixels or sample points in a line. This sequence of sample points is delayed $T_{BB}$ lines by means of the integer line delay 302, where $T_{BB}$ is equal to twice the integer part of the number of gap lines plus one line, i.e. $T_{BB}=1+2\times\text{round-down}(N_{GL})$.

The A input of the interpolator 306 is coupled to the output of the integer line delay 302 in order to receive the delayed sequence of sample points. The B input of the interpolator 306 is coupled to the output of the integer line delay 302 via a one-line delay 305. The signals provided to the A and B inputs of the interpolator 306 are provided in the same manner as the signals to the B and A inputs, respectively, are provided to the interpolator 304; interpolators 306 and 304 are thus reversely attached, that is the signals to the interpolator 306 on the B input are delayed one-line relative to the A input. The interpolator 306 may also implement the linear interpolation function, $$D=(A(1-C)+CB)$$

where D is a new point, A is the $T_{BB}$ lines delayed contribution from the sequence $S_B$, and B is the one-line plus $T_{BB}$ lines delayed contribution from the sequence $S_B$. C is an input onto which an interpolation coefficient $Ic_B$ may be applied. $Ic_B$ may be adjusted according to the fractional part of the gap line number. Generally, the interpolation coefficients are considered to have values between zero and one, where zero corresponds to an output D equal to A and one corresponds to an output D equal to B. The sequence of interpolated points is provided as a signal at the output B'.

The interpolation coefficient $Ic_B$ in the blue signal path is calculated as the fractional part of the number of gap lines, i.e. $Ic_B=\text{fraction}(N_{GL})$. The interpolation coefficient $Ic_R$ in the red signal path is calculated as the fractional part of the number of gap lines, i.e. $Ic_R=\text{fraction}(N_{GL})$. With this rule it is possible to estimate points corresponding to a red and blue representation of a given pixel on the original imaged and represented with a sample point provided by the green colour line sensor.

If the calculated number of gap lines $N_{GL}$ is an integer e.g. $N_{GL}=3$, then $T_{GG}=1+3=4$ lines, $T_{BB}=1+2\times 3=7$ lines, $Ic_B=\text{fraction}(3)=0$ and $Ic_R=\text{fraction}(3)=0$. Thus the output D of interpolator 304 in the red signal path is equal to the input A and the output D of interpolator 306 in the blue signal path is equal to the input A. That is, if G' is equal to GL(2, p), then R' is equal to RL(2, p) and B' is equal to BL(2, p). Corresponding to a mutual time delay dt=3 beween the blue/green and the green/red line signals, respectively, received at the inputs R, G, and B. In the implementation shown the sequence $S_R$ of sample points arriving at the R input is delayed 1 line, the sequence $S_G$ of sample points arriving at the G input is delayed 4 lines, and the sequence $S_B$ of sample points arriving at the B input is delayed 7 lines.

If the calculated number of gap lines $N_{GL}$ is a non-integer e.g. $N_{GL}=3\frac{5}{16}$, then $T_{GG}=1+3=4$ lines, $T_{BB}=1+2\times 3=7$ lines, $Ic_B=\text{fraction}(3\frac{5}{16})=\frac{5}{16}$ and $Ic_R=\text{fraction}(3\frac{5}{16})=\frac{5}{16}$. Thus if G' is equal to GL(2, p), then B', or the output D of interpolator 306 in the blue signal path, is equal to an estimated point $BL(2-\frac{5}{16})=BL(1\frac{11}{16})$. and R', or the output D of interpolator 304 in the red signal path, is equal to an estimated point $RL(2+\frac{5}{16})=RL(2\frac{5}{16})$. Corresponding to a mutual time delay $dt=3\frac{5}{16}$ beween respectively the blue/green and the green/red line signals received at the inputs R, G, and B. In the implementation shown the sequence $S_R$ of sample points arriving at the R input is delayed $\frac{11}{16}$ line, the sequence $S_G$ of sample points arriving at the G input is delayed 4 lines, and the sequence $S_B$ of sample points arriving at the B input is delayed $7\frac{5}{16}$ lines.

The colour line signals arriving according to the table in FIG. 2 are aligned according to the table in FIG. 5 by means of the alignment means 307. The interpolation means 308 comprises the interpolators 304 and 306 and the single line delays 303 and 305 and a by-pass connection.

Figure 4:
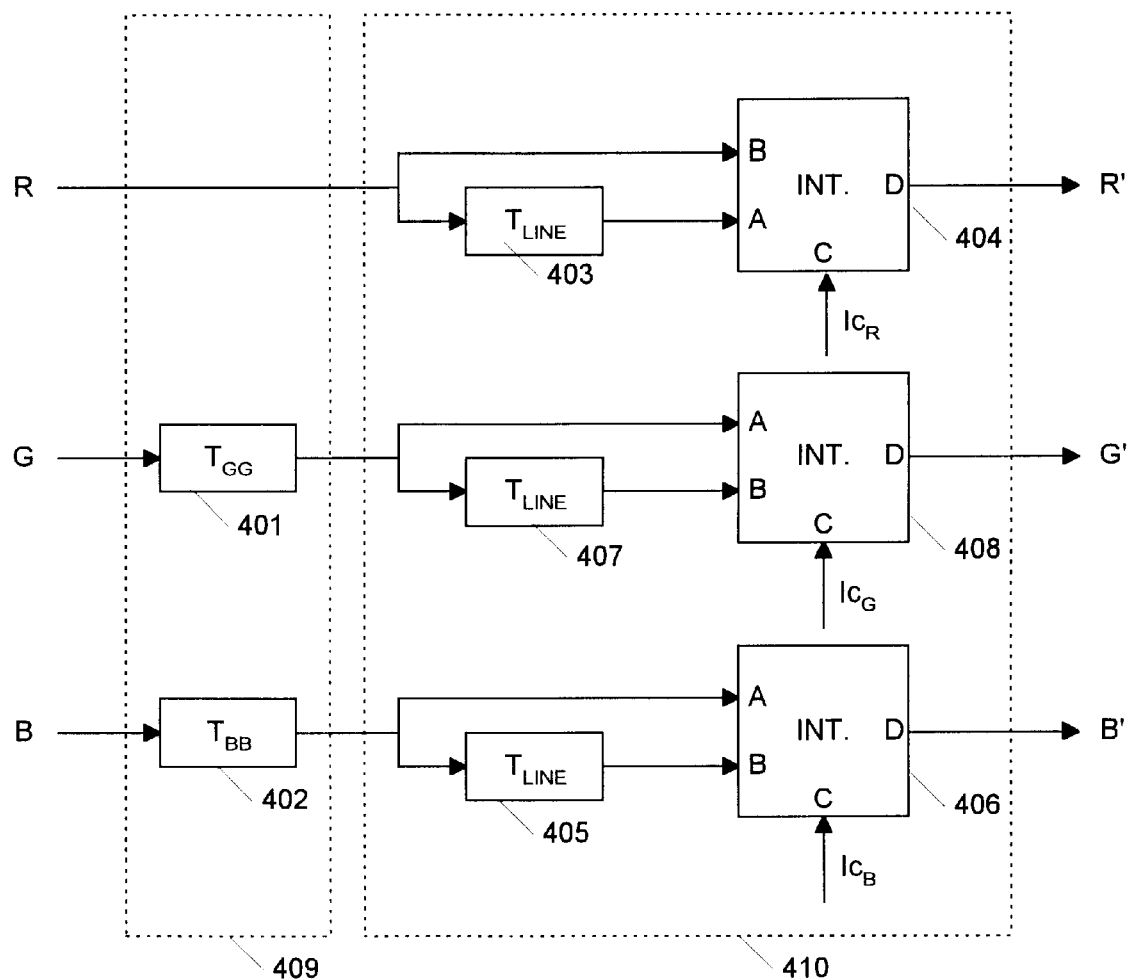
FIG. 4 shows another embodiment of three colour line signal paths, which are capable of combining colour line signals according to the invention.

FIG. 4 shows another embodiment of three colour line signal paths, which is capable of combining the colour line signals according to the invention. In this embodiment three colour line signals are combined, in accordance with the invention, such that a first colour line signal is estimated with a previously decided interpolation and such that the other colour line signals are estimated with respect the first interpolated colour line signal. It is thus possible to scan a document with a fixed interpolation coefficient for one colour line signal and adjusting the remaining colour line signals in correspondence with the feed rate. This embodiment comprises three signal paths R–R', G–G', and B–B', each comprising a respective interpolator circuit 404, 408, and 406 and a respective single line delay 403, 407, and 405. The interpolators are connected to receive signals as described in the description of FIG. 3 and in response to the respective interpolation coefficients $Ic_R$, $Ic_G$, and $Ic_B$. The signal path G–G' comprises an integer line delay 401 which is capable of delaying the signal provided at input G a number of lines corresponding to the value of the variable GG. Likewise, the signal path B–B' comprises an integer line delay 402 which is capable of delaying the signal provided at input B a number of lines corresponding to the value of the variable BB.

In the following three situations are considered, assuming that the number of gap lines $N_{GL}$ is known.

In a first situation a given interpolation k, $0\leq k<1$, in the signal path G–G' is selected, e.g. $Ic_G=k$ is set to 0, and the other circuit parameters are adjusted according to the invention. In this situation the number of lines GG to be delayed in the integer line delay 401 and the number of lines BB to be delayed in the integer line delay 402 can be calculated $$GG=1+\text{round-down}(N_{GL}-Ic_G)$$

$$BB=GG+\text{round-down}(N_{GL}+Ic_G)$$

The interpolation coefficient $Ic_R$ applied to interpolator 404 in the signal path R–R' and the interpolation coefficient $Ic_B$ applied to interpolator 406 in the signal path B–B' can be calculated $$Ic_R=\text{fraction}(N_{GL}-Ic_G)$$

$$Ic_B=\text{fraction}(N_{GL}+Ic_G)$$

In a second situation a given interpolation k, $0\leq k<1$, in the signal path B–B' is selected, e.g. $Ic_B=k$ is set to 0, and the other circuit parameters are adjusted according to the invention.

When $Ic_B=k$ is known, then $Ic_G$ may be calculated by means of this if-then-else statement:

if k-fraction($N_{GL}$)$\geq 0$ then $Ic_G$=k-fraction($N_{GL}$)

else $Ic_G$=k-fraction($N_{GL}$)+1.

In this second situation, after having found the corresponding $Ic_G$, the number of lines GG to be delayed in the integer line delay 401 and the number of lines BB to be delayed in the integer line delay 402 and interpolation $Ic_R$ can be calculated as stated in the first situation:

$GG=1+\text{round-down}(N_{GL}-Ic_G)$ $BB=GG+\text{round-down}(N_{GL}+Ic_G)$ $Ic_R=\text{fraction } (N_{GL}-Ic_G).$ In a third situation a given interpolation k, $0 \leq k < 1$, in the signal path R–R' is selected, e.g. $Ic_R=k$ is set to 0, and the other circuit parameters are adjusted according to the invention.

When $Ic_R=k$ is known then $Ic_G$ may be calculated by means of this if-then-else statement:

if $-k+\text{fraction}(N_{GL}) \geq 0$ then $Ic_G=-k+\text{fraction}(N_{GL})$ else $Ic_G=-k+\text{fraction}(N_{GL})+1.$ Note the minus sign if front of k.

Also, in this third situation, after having found the corresponding $Ic_G$, the number of lines GG to be delayed in the integer line delay 401 and the number of lines BB to be delayed in the integer line delay 402 and interpolation $Ic_B$ can be calculated as stated in the first situation:

$GG=1+\text{round-down}(N_{GL}-Ic_G)$ $BB=GG+\text{round-down}(N_{GL}+Ic_G)$ $Ic_B=\text{fraction}(N_{GL}+Ic_G)$ These three situations describe how the parameters $Ic_G$, $Ic_B$, $Ic_R$, GG, and BB may be adjusted mutually such that the samples provided at the outputs R', G', and B' represent pixels from the same line on the original.

The colour line signals arriving according to the table in FIG. 2 are aligned according to the table in FIG. 5 by means of the alignment means 409. The interpolation means 410 comprises the interpolators 404, 406, and 408 and the single line delays 403, 405 and 407.

FIG. 5 shows the colour line signals in FIG. 2, after being integer-aligned by the integer alignment means 307 or 409. Referring to FIG. 3, the red line signals are not delayed, the green line signals have been delayed $T_G=4$ lines by the delay 301, and the blue line signals have been delayed $T_B=7$ lines by the delay 302.

Thus at time t=9 the first sample point RL(3,1) of RL(3) is present at the input R, the first sample point GL(2,1) of GL(2) is present at the output of delay 301, and the first sample point BL(2,1) of BL(2) is present at the output of delay 302. Likewise all the sample points RL(3,1..P), GL(2, 1..P), and GL(2,1..P) are successively present, until time t=10 where first sample points RL(4,1), GL(3,1), and BL(3, 1) of the succeeding lines RL(4), GL(3), and BL(3) are present. This procedure continues until all colour line signals are processed.

With respect to the interpolators 304 and 306 the first sample point RL(3,1) of RL(3) is present at the B input of interpolator 304 and the first sample point RL(2,1) of RL(2) is present at the A input at time t=9. Further at time t=9 the first sample point BL(2,1) of BL(2) is present at the A input of interpolator 306 and the first sample point BL(1,1) of BL(1) is present at the B input. Corresponding to these inputs three signals are provided at the outputs R', G', and B'. The output at R' is an interpolated point between RL(2,1) and RL(3,1). The output at G' is the sample point GL(2,1). And the output at B' is an interpolated point between BL(2,1) and BL(1,2). Succeeding sample points from the colour line signals shown in FIG. 4 are processed likewise.

Figure 6:
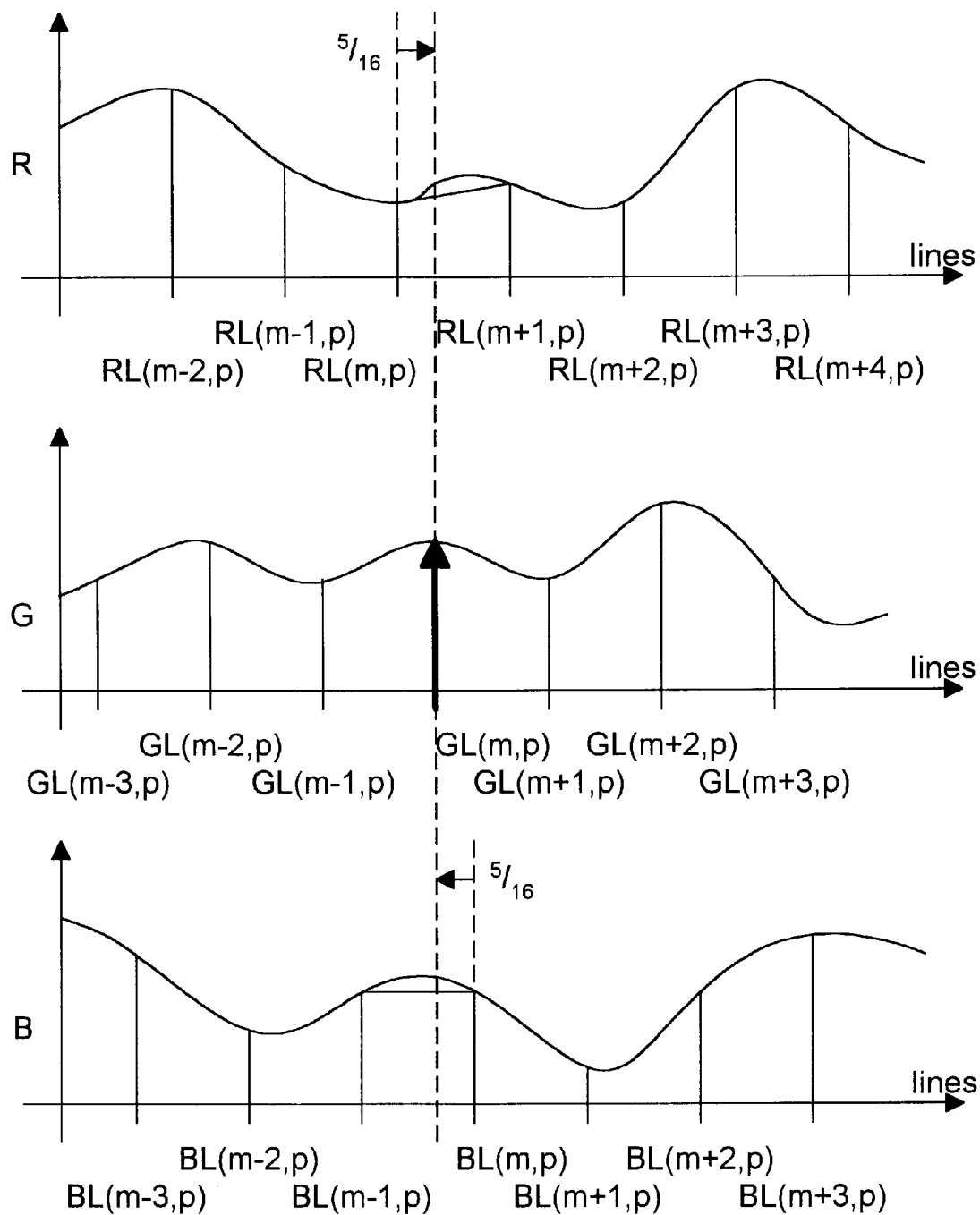
FIG. 6 shows colour variation on a scanned original represented by the colour signals RL(m−2 . . . m+4, p), GL(m−3 . . . m+3, p), and BL(m−3 . . . m+3, p), where p is a given pixel.

FIG. 6 shows the colour variation on a scanned original represented by the colour line signals RL(m-2..m+4, p), GL(m-3..m+3, p), and BL(m-3..m+3, p), where p is a given pixel. Sample points are indicated by vertical arrows. The dotted vertical line represents a sample point (pixel) from a line on the original imaged by the green colour line sensor $CLS_G$.

Referring to FIG. 3 the green sample points are not interpolated, this is shown for a specific sample point GL(m,p) in FIG. 6 by the bold arrow. This sample point represents the green colour information of a first pixel on the original. But there exists no sample point representing the red and blue colour information of that first pixel. Instead there exist sample points RL(m,p) and RL(m+1, p) representing the red information of pixels adjacent to said first pixel on the original. And there exist sample points BL(m-1,p) and BL(m,p) representing the blue information of other pixels adjacent to said first pixel on the original. These pairs of adjacent sample points are delivered to the interpolators 304 and 306 respectively.

In the example shown $N_{GL}=3\tfrac{5}{16}$. This results in that an estimated point BL(m-5/16,p) is calculated by linear interpolation located 5/16 from BL(m,p) towards BL(m-1,p) and that an estimated point RL(m+5/16,p) is calculated, located 5/16 from RL(m,p) towards RL(m+1,p).

If at a given point of time t=q, GL(m,p) is detected, then the red and blue colour line estimates are calculated for corresponding points of time $t=q+(N_{GL}/N_L)$ and $t=q-(N_{GL}/N_L)$, $N_L$ being the number of scanned lines per second. And further, if linear interpolation is used, then only signals from the neighbouring red and blue integer line pairs, i.e. neighbouring actually scanned lines, are used.

Figure 7:
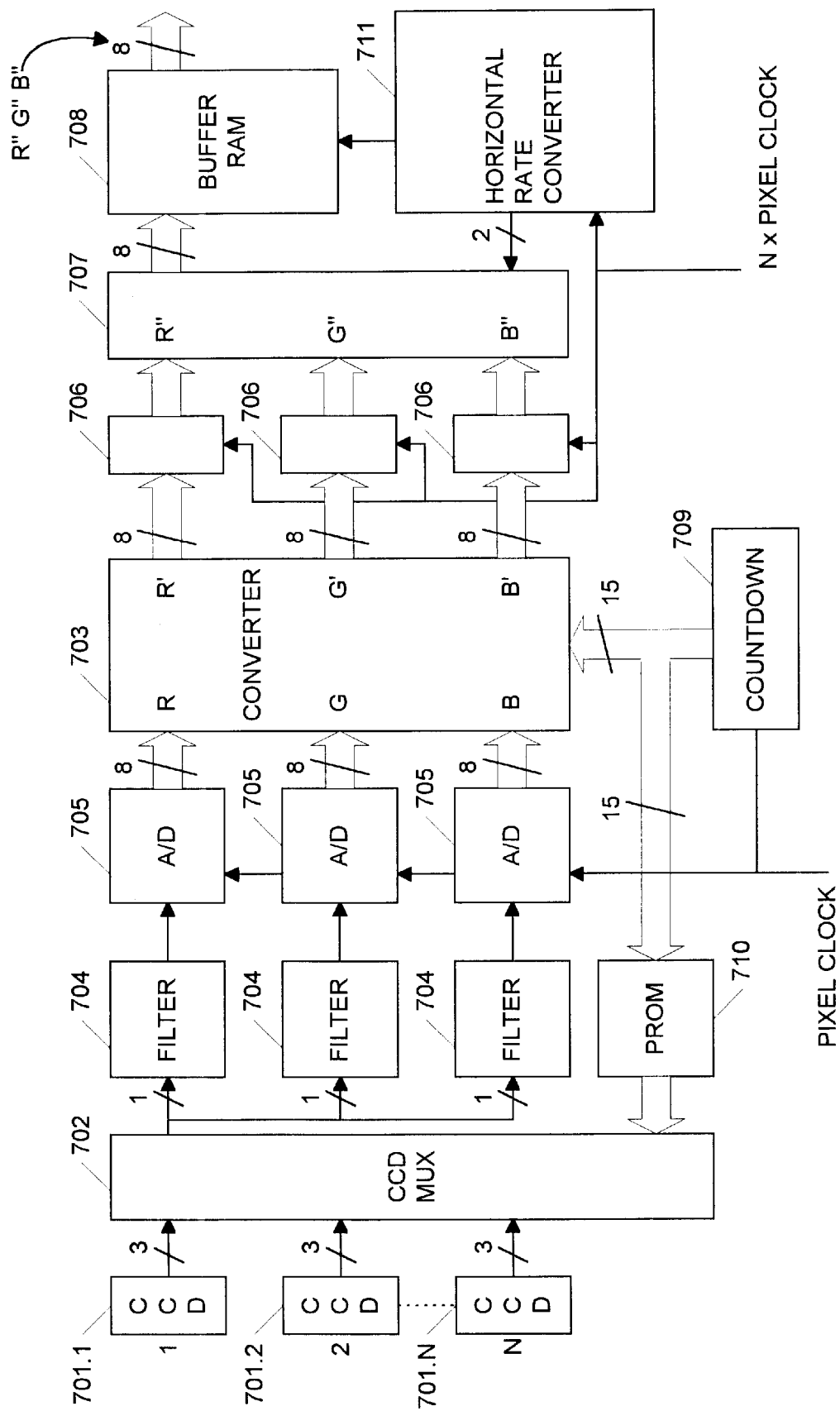
FIG. 7 shows a circuit diagram for an optical scanner according to the invention.

FIG. 7 shows a circuit diagram for a preferred embodiment of an optical scanner according to the invention. N line detectors 701.1–701.N are arranged in extension of each other, each detecting information from line segments on the original. The detected value for each pixel element is clocked out by a pixel clock and the colour line sensor information are multiplexed by means of a CCD multiplexer 702. This may be done e.g. in the manner disclosed in U.S. Pat. No. 5,117,295. The N line detectors thereby provide line signals RL( ), GL( ), and BL( ) for the three colours red, green, and blue, respectively.

The line detectors 701.1–701.N are connected to the CCD multiplexer 702 through respective 3-wire connections, the individual colour information signals from each of the colour line sensors of the line detector are transferred via separate lines. The individual colour information signals being transferred via connections from the CCD multiplexer 702 to the filters 704.

Line conversion for the individual colour information signals takes place in respective line conversion units in a line converter 703. Before the individual colour information signals are supplied to the line converter 703, the signals are filtered in filters 704, and the analog signals emitted from the filters 704 are digitized in analog-to-digital converters 705, which supplies digital 8-bit signals on the output. These signals are transferred via respective busses to the line converter 703. The line converter 703 supplies three digital signals R', G', B' on the output, corresponding to the respective signals R, G, B received on the input. The colour information signals R', G', B' are transferred from the output of the converter 703 via respective 8-bit data buses to digital filters 706, and further on to a multiplexer 707 in which the signals are time-multiplexed and are transferred via another 8-bit data bus to a buffer 708 in the form of a RAM store.

The N×PIXEL CLOCK signal is transferred to the digital filters 706 and to the horizontal rate converter 711. The signals arriving at the input of the filters 706 via the respective 8-bit data busses arrives with a rate corresponding to the pixel clock. The signals provided at the output of the filters 706 are provided at a rate corresponding to N times the pixel clock, where N is a positive integer. The filters 706 are thereby able to interpolate pixel values between the pixel values received at the input.

The resolution may be adjusted vertically (i.e. the number of lines per unit length on the original controlled by the feed rate) and horizontally (i.e. the number of pixels per line).

A count-down counter 709 is loaded at each line start with the number of pixels in a line, this value is received from a microcontroller (not shown). The actual value of the count-down is transferred via a 15-bit data bus to a PROM store 710 in which the value is used for selecting an address, the address concerned being used for controlling the multiplexing of the individual CCD line detectors 701.1–701.N. The line detectors 701.1–701.N are addressed successively (along scan lines), and the corresponding colour line sensor information is read.

The signal from the count down counter 709 is also transferred via a 15-bit bus to the line converter 703 in which the signal is used for addressing of pixel data within a scan line.

Figure 8:
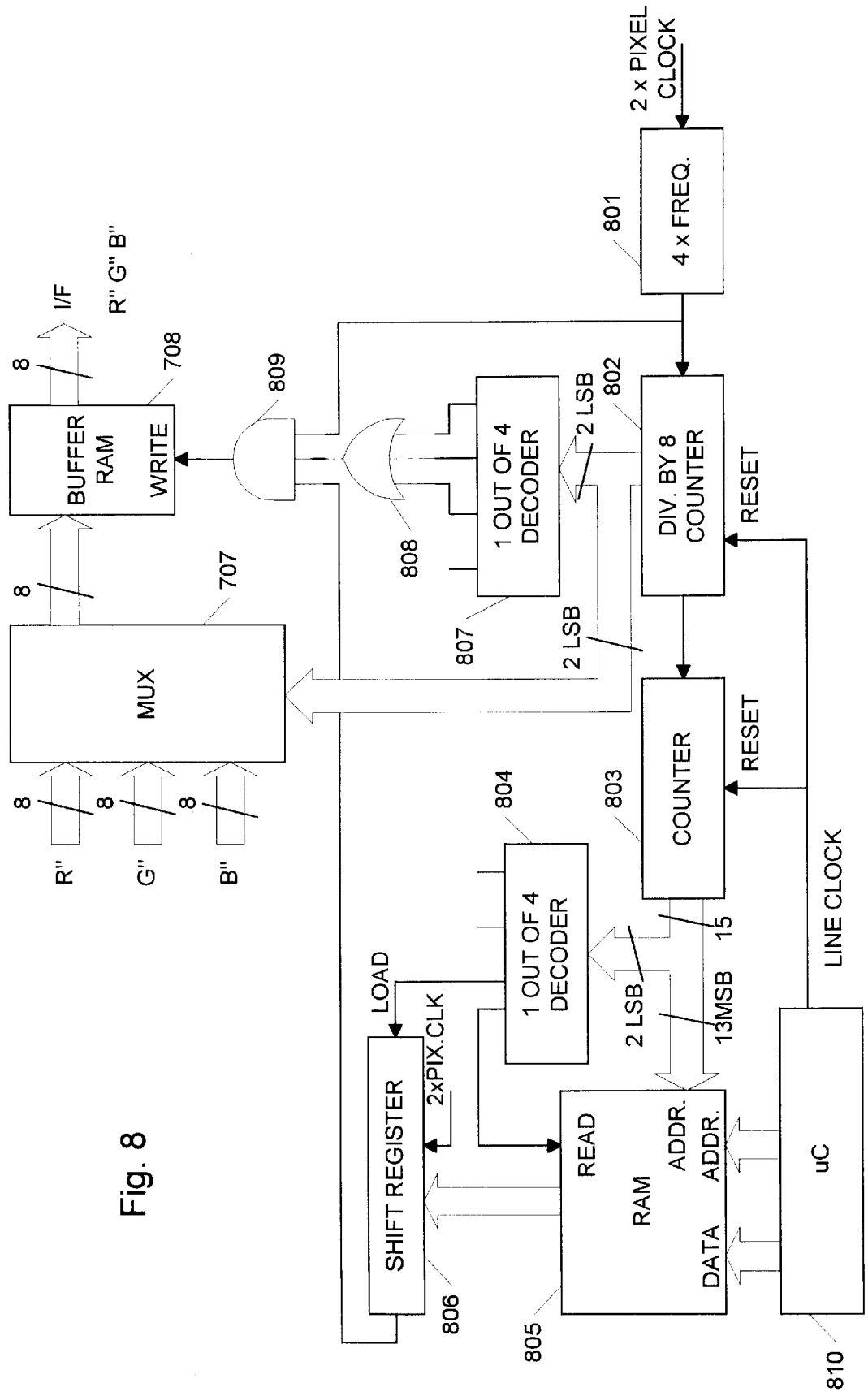
FIG. 8 shows an embodiment of a colour scanner for varying the horizontal pixel resolution of a scanner according to the invention.

FIG. 8 shows the horizontal resolution converter 711 in detail. This converter is capable of changing the resolution along lines (i.e. the number of pixels per line) by selecting certain pixel values from the signal provided at the output of the multiplexer 107. The principles for this converter are described in U.S. Pat. No. 5,502,578 'Optical Scanner having a Variable Resolution' which is hereby incorporated specifically in its entirety.

A pixel clock signal is passed to a counter 803 which counts this pixel clock, and the 13 most significant bits of the 15 bit output signal from the counter 803 is applied to a RAM store 805 via a data bus. The two least significant bits are passed to a one-out-of-four decoder 804 which loads the contents of the shift register 806 from RAM store 805.

Prior to scanning, the microcontroller 810 has determined the sample points of the scanning, corresponding to the desired resolution, and these sample points are stored in multibit form in the RAM store 805.

The digital signal from the counter 803 is employed for addressing and reading the multibit (8-bit) words of local sample points from RAM 805, the serial output of which are then transferred to the shift register 806 and are used as an enable input to the AND gate 809.

The N×pixel clock signal, here shown for N=2, is frequency-multiplied by 4 in multiplier 801 and is used as a clock for a divide-by-eight counter 802, the output being used as a clock for the counter 803, i.e. corresponding to the pixel clock. The output signal from the counter 803 is applied to a RAM store 805 via a 15-bit data bus.

The two least significant bits from the divide-by-eight counter are used for changing the output from the multiplexer 707 between the signals R", G" and B". Further, the two least significant bits are also used via the one-out-of-four decoder and the OR gate 808 for providing an input to the AND gate 809, indicating when the R",G", and B" signals on the output of the multiplexer are present.

An output equal to "1" from the shift register 806 to the AND gate indicates that a triplet group of R" G" B" data is to be sampled. The frequency-multiplied clock signal (8×pixel clock) is applied to the AND gate for giving three write pulses to the buffer RAM store 708 for each triplet which is to be sampled to the buffer RAM 708.

The time-multiplexed colour information is transferred from the RAM store 808 to an interface unit I/F (not shown) via an 8-bit databus.

Figure 9:
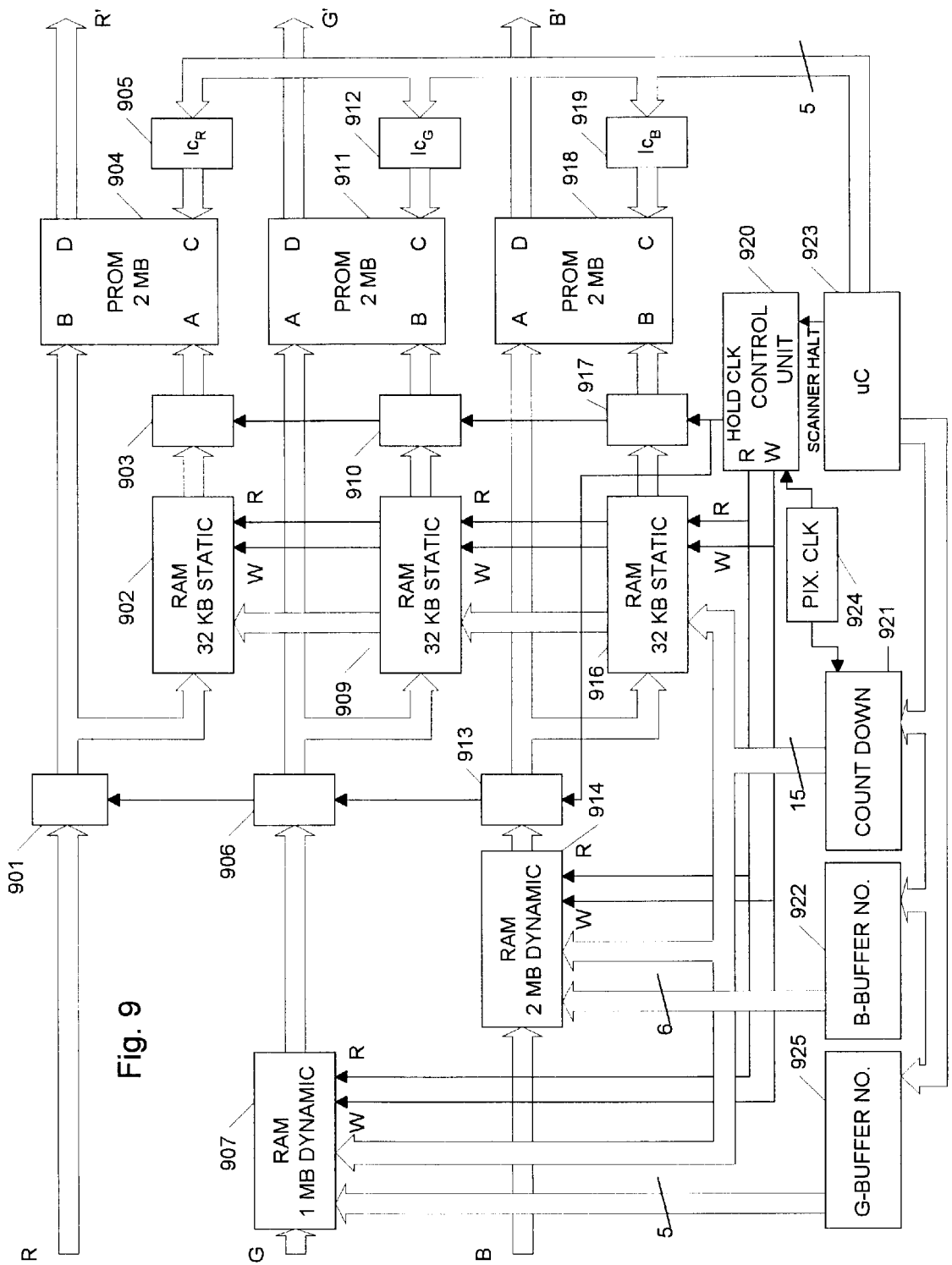
FIG. 9 is a schematical view of a first line converter circuit of a colour scanner according to the invention.

FIG. 9 shows the line converter 703 in detail. The individual colour information signals from each of the line sensors 701.1–701.N is supplied from the A/D converters 705 as R, G, and B signals via three 8-bit busses. The digital colour information signal R is passed to a hold circuit 901 which applies the same signal on the output as received on the input in response to a clock signal, and the output is connected to an 8-bit data bus which is branched so that the signal is passed to an input A on a PROM circuit 904 as well as to a buffer 902. This buffer may e.g. be a static RAM store having a storage capacity of 32 kbytes. With this storage capacity it is possible to use the buffer 902 for lines composed of up to 6 CCD line detectors each having 5000 pixels per colour. While a pixel value is written from the RAM store 902, the store cell concerned is overwritten with the new pixel value for a following line. Data are written from the RAM store 902 and are transferred via an 8-bit databus to a hold circuit 903 which is clocked out with the same clock as the hold circuit 901. Thus, two associated pixel values for two consecutive lines are transferred to the A gate and the B gate on the PROM circuit 904. The PROM circuit 904 simultaneously receives a 5-bit interpolation value from the microcontroller 923, which takes place via a hold circuit 905 whose contents are transferred to the C gate of the PROM circuit 904, while said circuit receives the pixel values on the A and B gates.

The PROM circuit 904 supplies an output signal D, and this output signal is calculated by means of an algorithm stored in the PROM circuit 904. This algorithm may be expressed as follows:

$$D=(A(16-C)+CB)/16$$

wherein B and A are the actual pixel values of the last-read scan line and the next-to-the-last-read scan line, while C is the interpolation coefficient, $Ic_R$, for the red colour. The interpolation coefficient can be viewed as a fraction of the distance between the next-to-the-last-read scan line and the last-read scan line. The output D is then a linear interpolated value, interpolated at a distance C relative to the location of A and towards the location of B. The output D from the PROM circuit 904 is denoted R'. The interpolation coefficient C is a 5-bit value and is thus a rounding off of the actual interpolation factor, but it has been found in practice that it is fully sufficient to use a value having 16 possible levels in the calculations here. Similar signal processing takes place for each of the other colour information signals G and B. The RAM store 902, the PROM circuit 904, and the hold circuits 901, 903 have corresponding, preferably identical counterparts 909, 911, 906, 910 and 916, 918, 913, 917 in the line converter 703.

Since the colour information signals for the colours blue, green and red collected simultaneously with the line detector 103 are offset on the original for scanning, buffer stores 907 and 914 are coupled in the converter, ensuring that the output signals B', G' and R' from the converter are formed by colour information signals collected from the same line on the original 101.

For this purpose the buffer 907 is preferably selected as a dynamic RAM store having a storage capacity of 1 megabyte. This is expedient since dynamic RAM stores are relatively inexpensive, and the need of the dynamic RAM stores for current refreshing is ensured in normal operation in a read, modify and write cycle. If scanning is halted temporarily, it is ensured that the contents are not changed in that the dynamic RAMs run through a read-only cycle in which data are only refreshed so that scanning can be resumed from the scan line where feeding of the original was halted. This ensures that the data flow from the scanner can be regulated by start-halt of the scanning, and data overflow can be avoided. Similarly, the buffer store 914 is provided with a dynamic RAM store which has twice the capacity of the buffer store 907. These dynamic RAM stores are addressed by means of the address bus which is also connected to the 32 KB static RAM stores 916, 909, and 902.

The microcontroller 923 applies a coefficient of interpolation $Ic_B$ to the hold circuit 919, a coefficient of interpolation $Ic_G$ to the hold circuit 912, and a coefficient of interpolation $Ic_R$ to the hold circuit 905. Thereby providing interpolation coefficients to the red, green, and blue signal paths. This circuit design provides a very flexible solution for an embodiment of the invention, where any colour may be selected as the colour which is not interpolated.

The microcontroller 923 further applies a value for the amount of pixels in a scanned line for the count-down counter 921, said value serving as an address in the delay buffers 902, 909 and 916 and dynamic RAM stores 907 and 914. Also the microcontroller 923 applies a value for the register 922, said value marking the buffer number or the line number in the buffer store 914 and serving as the most significant part of the address in the dynamic RAM store 914.

The microcontroller 923 further applies a value for the register 925, said figure marking the buffer number or the line number in the buffer store 907 and serving as the most significant part of the address in the dynamic RAM store 907.

Figure 10:
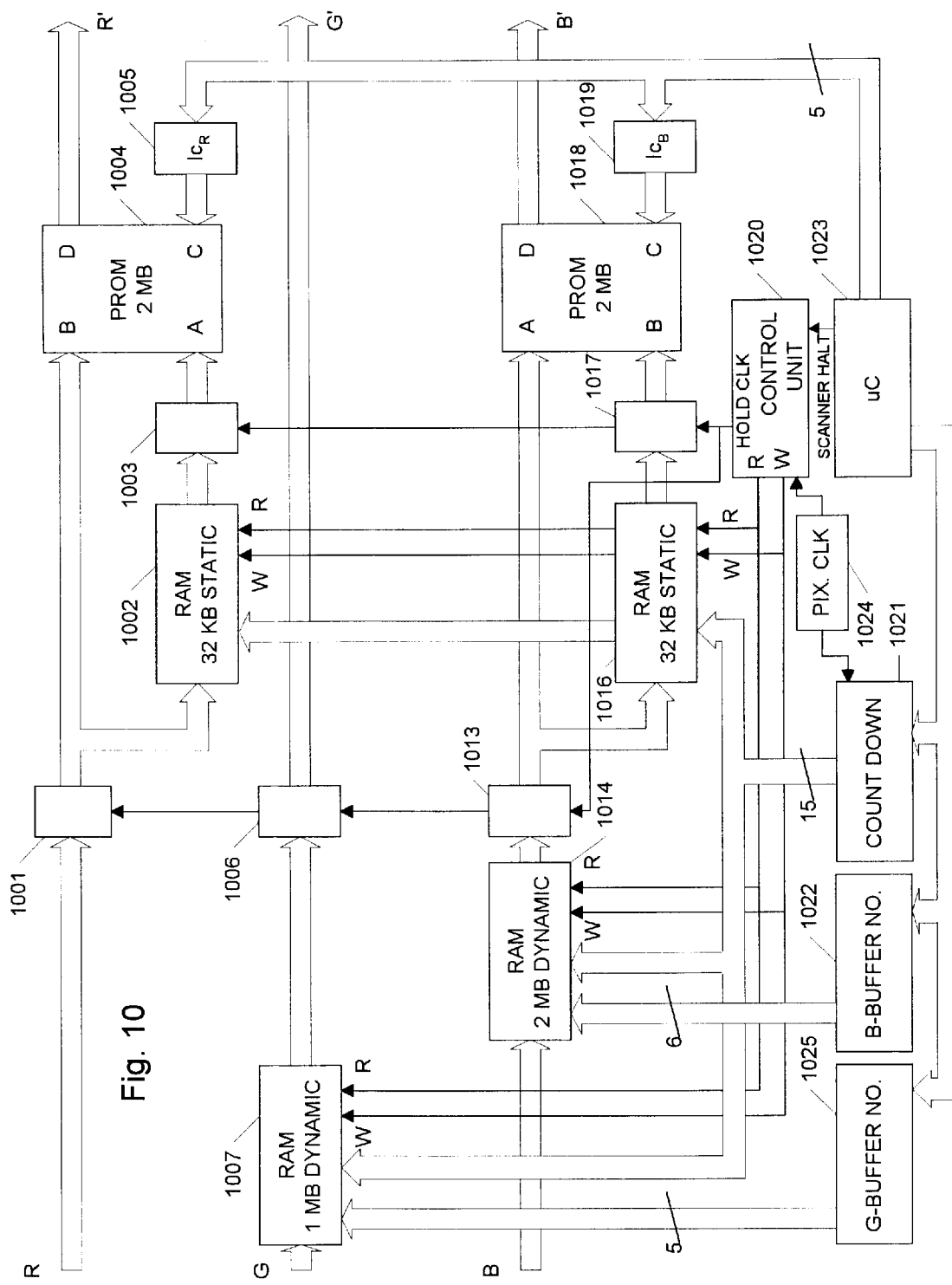
FIG. 10 is a schematical view of a second embodiment of a line converter circuit of a colour scanner according to the invention.

FIG. 10 shows another embodiment of the line converter 703, where the red and blue colour line signals may be interpolated, whereas the green colour line signals remain uninterpolated. The digital colour information signal R is passed to a hold circuit 1001 which applies the same signal on the output as received on the input in response to a clock signal, and the output is connected to an 8-bit data bus which is branched so that the signal is passed to an input A on a PROM circuit 1004 as well as to a buffer 1002, and this buffer may e.g. be a static RAM store having a storage capacity of 32 kbytes. With this storage capacity it is possible to use the buffer 1002 for lines composed of up to 6 CCD line detectors each having 5000 pixels per colour. While a pixel value is written from the RAM store 1002, the store cell concerned is overwritten with the new pixel value for a following line. Data are written from the RAM store 1002 and are transferred via an 8-bit databus to a hold circuit 1003 which is clocked out with the same clock as the hold circuit 1001. Thus, two associated pixel values for two consecutive lines are transferred to the A gate and the B gate on the PROM circuit 1004. The PROM circuit 1004 simultaneously receives a 5-bit interpolation value from the microcontroller 1023, which takes place via a hold circuit 1005 whose contents are transferred to the C gate of the PROM circuit 1004, while said circuit receives the pixel values on the A and B gates.

The PROM circuit 1004 supplies an output signal D, and this output signal is calculated by means of an algorithm stored in the PROM circuit 1004. This algorithm may be expressed as follows:

$$D=(A(16-C)+CB)/16$$

wherein B and A are the actual pixel values of the next-to-the-last-read scan line and the last-read scan line, while C is an interpolation coefficient, $Ic_R$, for the red colour. The interpolation coefficient can be viewed as a fraction of the distance between the next-to-last-read scan line and the the last-read scan line. The output D is then a linear interpolated value, interpolated at a distance C relative to the location of A and towards the location of B. The output D from the PROM circuit 1004 is denoted R'. The interpolation coefficient C is a 5-bit value. Similar signal processing takes place for colour information signal B. That is, the hold circuits 1001, 1003, the RAM store 1002 and the PROM circuit 1004 have corresponding, preferably identical counterparts 1013, 1017, 1016, and 1018.

Since the colour information signals for the colours blue, green and red collected simultaneously with the line detector 103 are offset on the original for scanning, buffer stores 1007 and 1014 are coupled in the converter, ensuring that the output signals B', G' and R' from the converter are formed by colour information signals collected from the same line on the original 101. For this purpose the buffer 1007 is preferably selected as a dynamic RAM store having a storage capacity of 1 megabyte. Similarly, the buffer store 1014 is provided with a dynamic RAM store which has twice the capacity of the buffer store 1007.

Since the green colour line signals remain uninterpolated in this embodiment, no interpolation circuit is needed. The output from the buffer RAM 1007 is passed to a hold circuit 1006 which applies the same signal on the output as received on the input in response to a clock signal, and the output is connected to an 8-bit data bus which provides the uninterpolated but integer line delayed green colour line signal G'.

The microcontroller 1023 applies a coefficient of interpolation $Ic_B$ to the hold circuit 1019 and a coefficient of interpolation $Ic_R$ to the hold circuit 1005. Thereby providing interpolation factors to the red and blue signal path.

The microcontroller 1023 further applies a figure for the amount of pixels in a scanned line for the count-down counter 1021, said figure serving as an address in the delay buffers 1002 and 1016 and dynamic RAM stores 1007 and 1014. Also microcontroller 1023 applies a value for the register 1022, said figure marking the buffer number or the line number in the buffer store 1007 and 1014 and serving as the most significant part of the address in the dynamic RAM stores which constitute the buffer 1007 and 1014.

A scanner-halted signal may be applied by the microcontroller 1023 to the control unit 1020, which controls writing and reading for the buffer registers in the converter 1003. As long as interpolation lines are to be calculated, reading and writing are currently performed in the RAM stores and buffer registers, while only reading is performed when a scanner-halted signal is received, so that the contents are not changed in the dynamic RAM stores 1007 and 1014 and delay buffers 1002 and 1016.

Figure 11:
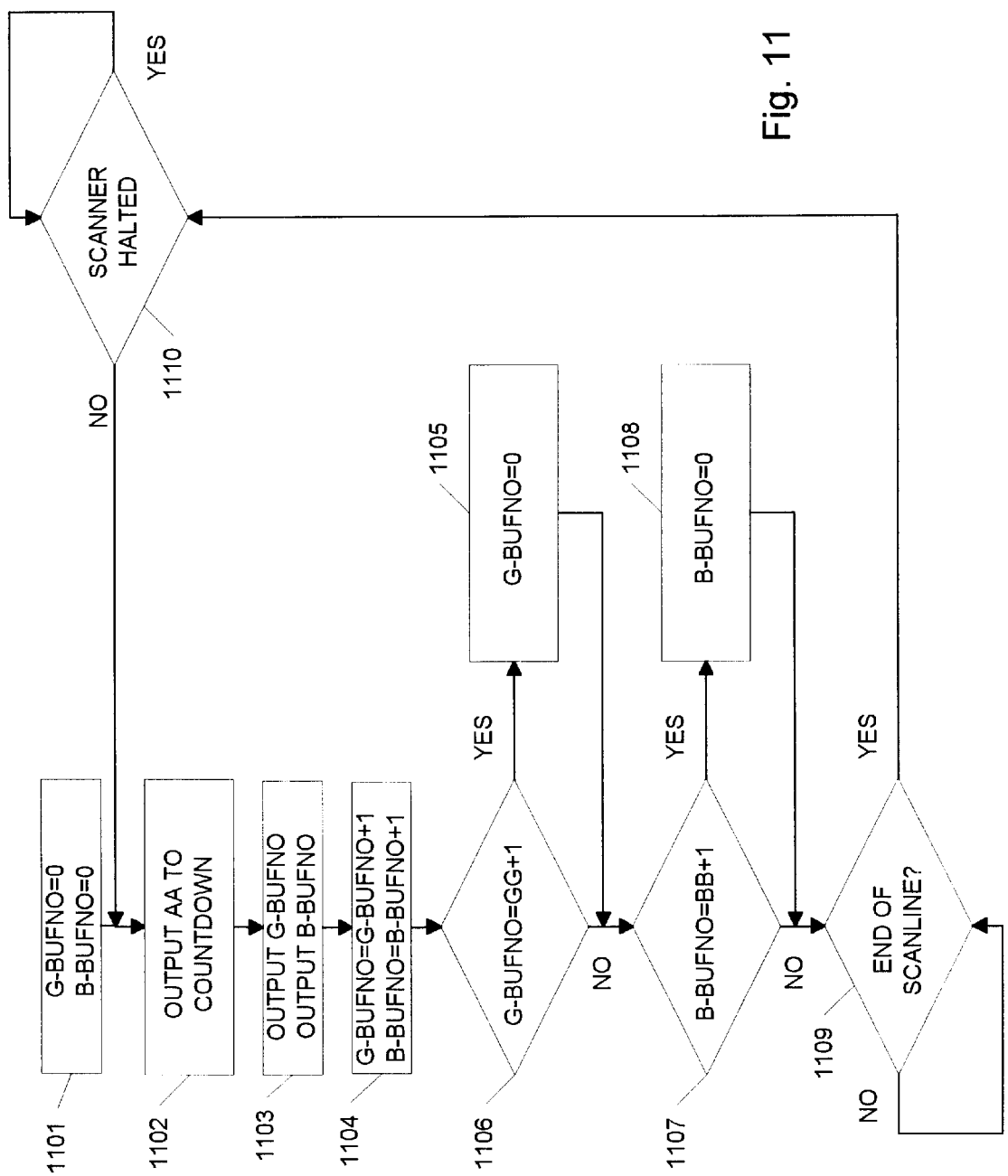
FIG. 11 shows a flow chart showing how BUFNO and count down are provided.

FIG. 11 shows a flow chart for an algorithm for the calculation and transfer of BUFNO and count down values from the microcontroller 923; 1023 to the counter 921; 1021 and the registers 922; 1022 and 925; 1025. In the flow diagram, G-BUFNO and B-BUFNO is initially reset in step 1101, and in step 1102 the number of pixels AA in a scan line is transferred to the count-down counter 921; 1021., G-BUFNO and B-BUFNO are transferred in step 1103 to the register 922; 1022 and register 925; 1025 respectively, and G-BUFNO and B-BUFNO are counted one up in step 1104. In step 1106 the microcontroller 923; 1023 checks whether G-BUFNO is equal to the number of steps BB between the CCD lines plus one, while MSB is equal to zero. If this is the case (YES), G-BUFNO is reset. This takes place in step 1105. In step 1107 it is checked whether B-BUFNO is equal to BB plus one, and if this is the case, B-BUFNO is reset in step 1108.

It is checked in step 1109 whether the scan line is finished, and if this is the case, the program jumps to a step 1110 in which it is checked whether a scanner-halted signal has been received. If this is not the case, the program jumps back to step 1102, and the procedure is repeated.

Figures 12, 13:
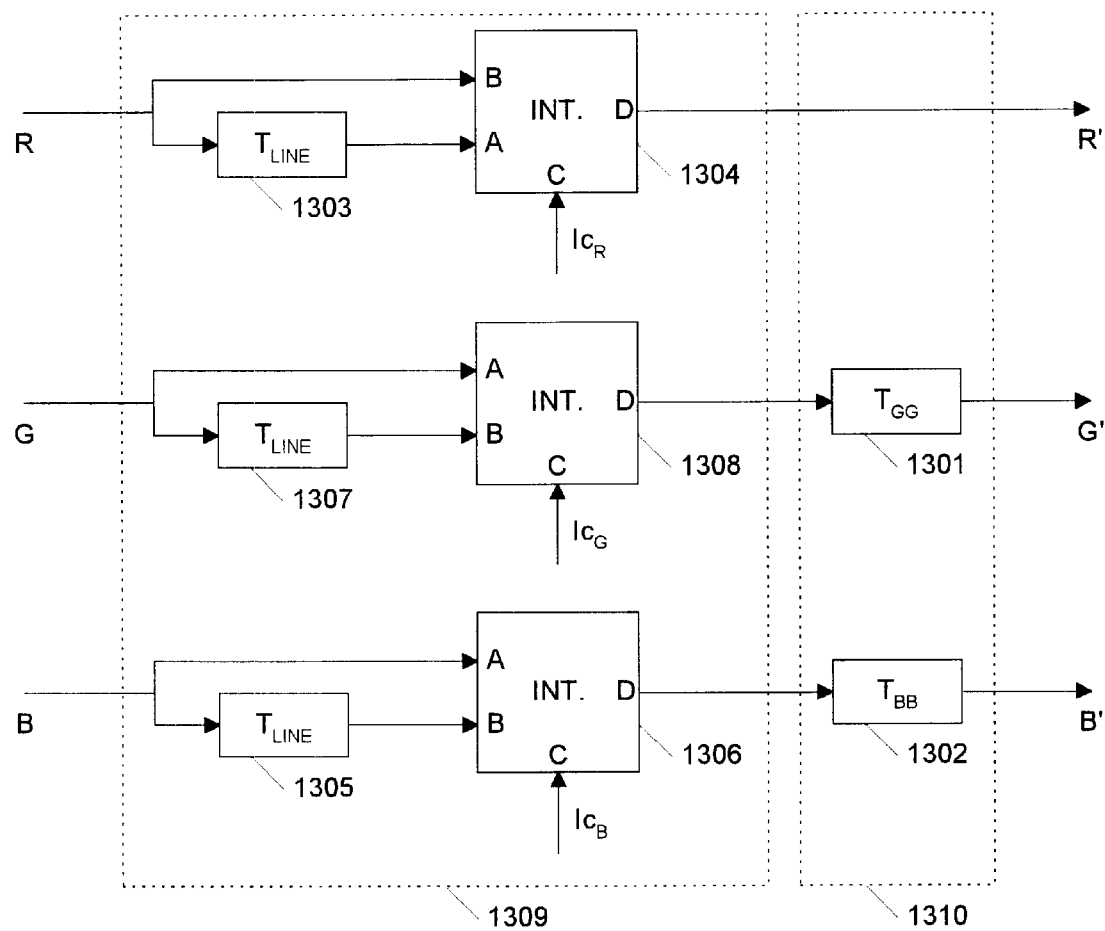
FIG. 12 shows the transfer function of the interpolation circuits.
FIG. 13 shows still another embodiment of three colour line signal paths, which is capable of combining colour line signals according to the invention.

FIG. 12 shows the transfer function of the interpolation circuits. C is an interpolation coefficient applied to a interpolation circuit. A and B is the values applied at the A and B inputs of the interpolation circuit. D is the result of the interpolation which is located a fraction $^{6}/_{16}$ of the distance between A and D measured from A towards B.

FIG. 13 shows still another embodiment of three colour line signal paths, which is capable of combining colour line signals according to the invention. In this embodiment the colour line signals received at the inputs R, G, and B may be interpolated. The interpolated values may then be aligned in order to combine the colour line signals and to obtain a three-colour-representation of a scanned original.

The single line delays 1303, 1305, and 1307 are connected to delay each of the colour line signals received at the inputs R, G, and B one line. The interpolators are connected to receive the one line-delayed colour-line-signals and the colour-line-signals received at the inputs R, G, and B. The interpolators 1304, 1306, and 1308 provides interpolated values at the respective D outputs. The integer line delays 1301 and 1302 are placed after the interpolators to receive the interpolated values from the interpolators 1308 and 1306.

The colour line signals received at the inputs R, G, and B are thereby interpolated and aligned.

In this embodiment the interpolation means 1309 comprises the interpolators 1304, 1306, and 1308 and the single line delays 1303, 1305, and 1307. The colour line signals are aligned by means of the alignment means 1310 comprising the single line delays 1301 and 1302 and a bypass connection.

Figure 14:
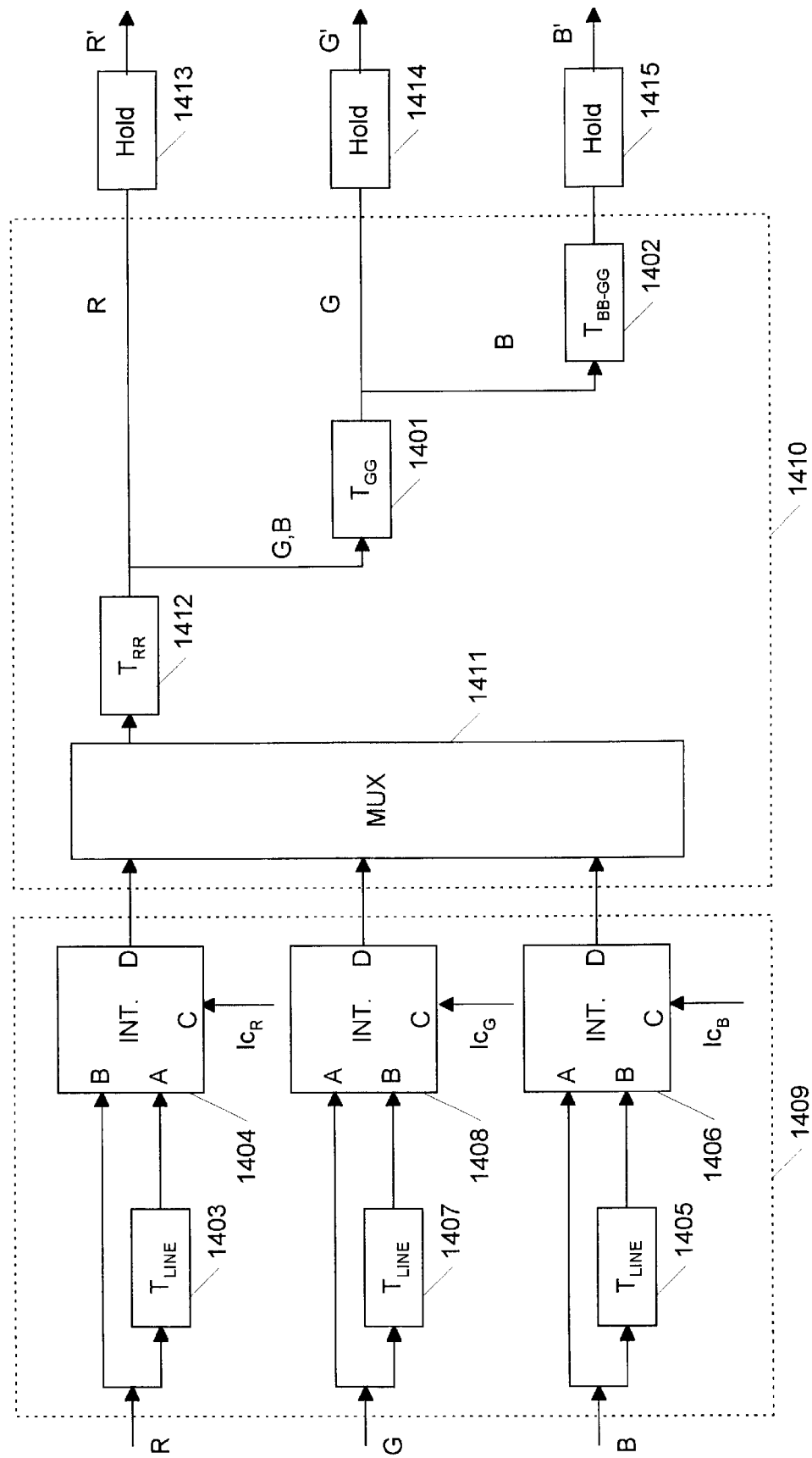
FIG. 14 shows still another embodiment of three colour line signal paths, which is capable of combining colour line signals according to the invention.

FIG. 14 shows still another embodiment of three colour line signal paths, which is capable of combining colour line signals according to the invention. In this embodiment the colour line signals received at the inputs R, G, and B may be interpolated. The interpolated values may then be aligned. This alignment is carried out by means of multiplexed colour line signals and common delays.

The single line delays 1403, 1405, and 1407 are connected to delay each of the colour line signals received at the inputs R, G, and B one line. The interpolators are connected to receive the one line delayed colour line signals and the colour line signals received at the inputs R, G, and B. The interpolators 1404, 1406, and 1408 are adapted to provide interpolated values at the respective D outputs. The multiplexer 1411 addresses the respective D outputs of the interpolators successively sample-by-sample and provides thereby a time-multiplexed sequence of the colour line signals received at the inputs R, G, and B. The time-multiplexed sequence is delayed $T_{RR}$ lines in the in the common delay 1412. Samples in the delayed sequence and present at a time slot corresponding to samples received at the R-input are provided to the hold circuit 1413. Further, samples in the delayed sequence and present at time slots corresponding to samples received at the G- and B-input are provided to the delay 1401 delaying this sequence $T_{GG}$ lines. The output of this delay is likewise split into two branches. Samples present at a time slot corresponding to samples received at the G-input are provided to the hold circuit 1414, and samples present at a time slot corresponding to samples received at the B-input are provided to the hold circuit 1415 via the delay 1402 delaying signals at the B input $T_{BB-GG}$ lines.

This embodiment is particularly interesting when integrated gate-arrays are used or the circuit is mounted directly on camera boards together with the line detector. The interpolators 1404, 1406, and 1908 and the multiplexer 1411 may than be placed in the gate-array design whereas the delays may be placed in extenal RAM stores. The design area in the gate-array or on the camera boards is thereby not occupied by the area demanding delays.

In this embodiment the interpolation means 1409 comprises the interpolators 1404, 1406, and 1408 and the single line delays 1403, 1405, and 1407. The colour line signals are aligned by means of the alignment means 1410 comprising the delays 1401, 1402, and 1412, the multiplexer 1411 and appropriate de-multiplexers (not shown).

I claim:

1. An optical colour scanner with a variable line resolution, said scanner collecting information from an original along lines, comprising:

a line detector comprising a first and a second colour line sensor arranged substantially in parallel and at a mutual distance which can be measured as a number of gap lines corresponding to a number of lines at the actual line resolution; said colour line sensors registering colour information from lines on the original thereby providing a first and a second colour signal which represent the registered colour information;

a plurality of signal paths, at least comprising a first and a second signal path; said first signal path comprising:
   an analog-to-digital converter connected to receive said first colour signal and to convert this signal into a digital colour signal;
   a first integer line delay; said integer line delay connected to delay said digital colour signal a first number of lines and providing a first output signal; said second signal path comprising:
   an analog-to-digital converter connected to receive said second colour signal and to convert said second colour signal into a digital colour signal;
   a single line delay; and
   an interpolator connected to receive a one line delayed digital colour signal via said single line delay and connected to receive said digital colour signal; said interpolator forming an interpolated colour signal located between said one line delayed digital colour signal and said digital colour signal, which location is determined by a first interpolation coefficient, said interpolated colour signal is thereby provided as a second output signal;
   said first number of lines and said first interpolation coefficient being mutually adjusted such that said second output signal is located at a position coincident with said first output signal and such that at least one of said output signals represent registered colour information.

2. An optical scanner according to claim 1, wherein said line detector further comprises a third colour line sensor arranged adjacent to and substantially parallel with said first colour line sensor and having a distance to said first colour line sensor that can be measured as a number of gap lines.

3. An optical scanner according to claim 2, further comprising a third signal path comprising:
   an analog-to-digital converter connected to receive said first colour signal and to convert said colour signal into a digital colour signal;
   a second integer line delay, connected to delay said digital colour signal a second number of lines, thereby providing a first delayed colour signal;

a single line delay connected to delay said first delayed colour signal, thereby providing a second delayed colour signal; and an interpolator connected to receive said first and second delayed digital colour signal; said interpolator forming an interpolated colour signal located between said first delayed digital colour signal and said second delayed colour signal, which interpolated colour signal location is determined by a second interpolation coefficient, said interpolated colour signal is thereby provided as a third output signal.

4. An optical scanner according to claim 3, wherein said second interpolation coefficient and said second number of lines are mutually adjusted such that said third output signal is located at a position coincident with said first and second output signals.

5. An optical scanner according to claim 3, wherein said second number of lines is equal to one plus twice the integer part of said gap line number and wherein said first interpolation coefficient is equal to the fractional part of said gap line number.

6. An optical scanner according to claim 1, wherein said first number of lines is equal to one plus the integer part of said gap line number and wherein said first interpolation coefficient is equal to the fractional part of said gap line number.

7. An optical scanner according to claim 1, wherein said first signal path further comprises:

a single line delay connected to delay said first output signal, thereby providing a delayed output signal; and an interpolator connected to receive said first output signal and connected to receive said delayed output signal; said interpolator forming an interpolated colour signal located between said first output signal and said delayed output signal; the location of said interpolated colour signal is determined by a third interpolation coefficient; said first output signal is thereby modified and provided as an interpolated colour signal.

8. An optical scanner according to claim 1, further comprising a microcontroller providing interpolation coefficients to said interpolators, and wherein said interpolators comprise a PROM circuit that calculates the interpolation signal by means of colur signals from two successively scanned lines and the interpolation coefficient received from the microcontroller.

9. An optical scanner according to claim 8, wherein said interpolator comprises means for calculating the interpolation signal according to the algorithm:

$$D=(A(16-C)+CB)/16$$

wherein D is the interpolated colour signal, A and B are signals representing scanned lines mutually delayed one line, and C represents the interpolation coefficient and is a distance between a scanned line and the interpolated colour signal.

10. An optical scanner according to claim 1, wherein said colour line sensors comprises CCD-arrays having pixel elements; said pixel elements providing analog values that are clocked out under control of a pixel clock signal in order to form colour line signals.

11. An optical scanner according to claim 1, wherein said colour line sensors comprises respective colour filters and wherein said first first colour line sensor comprises a green colour filter.

12. An optical scanner according to claim 1, wherein said colour line sensors comprises:

a plurality of individual CCD arrays arranged in extension of each other; each of said individual CCD arrays providing a colour line segment signal; and wherein said optical scanner further comprises:

a multiplexer to receive said individual colour line segment signals and successively addressing said individual CCD arrays in order to form colour line signals composed of colour line segment signals; and analog filters to filter said colour line signals and thereby providing signals that are delivered as input to said signal paths.

13. An optical scanner according to claim 1, further comprising calculation means, which in response to a desired resolution or the feed rate calculates the duration of said integer line delays and the value of said interpolation coefficients.

14. An optical scanner according to claim 1, further comprising:

digital filters, to filter said output signals from said signal paths thereby providing filtered output signals having samples at a first rate; said first rate being controlled by a clock signal;

a multiplexer to successively address said filtered output signals and combine said filtered output signals;

a horizontal rate conterter to control said addressing such that certain samples are selected, in order to provide a desired along lines resolution.

15. An optical scanner according to claim 1, further comprising:

a multiplexer to successively address said output signals from said signal paths and combine said output signals.

16. An optical scanner according to claim 1, further comprising displacement means, such that said original is moved past said line detector with a feed rate resulting in a desired vertical resolution of scanning.

17. An optical scanner according to claim 1, further comprising displacement means, such that said line detector is moved past said original with a feed rate resulting in a desired vertical resolution of scanning.

18. An optical colour scanner with a line resolution, said scanner collecting information from an original, comprising:

a line detector comprising a set of colour line sensors arranged substantially in parallel and at a mutual distance, said colour line sensors registering colour information from pixels on the original, thereby providing a colour signal for each colour line sensor that represents the registered colour information, at least comprising a first colour signal;

first integer line delay means connected to delay said first colour signal;

interpolation means connected to receive the delayed first colour signal and said first colour signal and adapted for calculating interpolated values in response to an interpolation coefficient, thereby estimating colour information between the registered colour information from lines on the original;

said interpolation coefficient being adjusted such that said interpolated values are located at a position coincident with a registered pixel represented by means of a sample point in said second colour signal;

taking said interpolated values and said second colour signal as output signals.

19. An optical colour scanner according to claim 18, wherein said colour line sensors comprise respective colour filters.

20. An optical scanner according to claim 18, wherein said colour line sensors comprise:
- a plurality of individual CCD arrays arranged in extension of each other; each of said individual CCD arrays providing a colour line segment signal; and wherein said optical scanner further comprises:
    - a multiplexer to receive said individual colour line segment signals and successively addressing said individual CCD arrays in order to form colour line signals composed of colour line segment signals; and
    - analog filters to filter said colour line signals and thereby providing signals which are provided as input to said signal paths.

21. An optical scanner according to claim 18, further comprising displacement means, such that said original is moved past said line detector with a feed rate resulting in a desired vertical resolution of scanning.

22. An optical scanner according to claim 18, further comprising displacement means, such that said line detector is moved past said original with a feed rate resulting in a desired vertical resolution of scanning.

23. An optical scanner according to claim 18, wherein said interpolation means is connected to receive the registered colour signals from said line detector.

24. An optical scanner according to claim 18, wherein said interpolation means comprises two inputs receiving colour signals that are mutually delayed by means of a single line delay with a duration corresponding to one scanned line.

25. An optical scanner according to claim 18, wherein said interpolator means calculates interpolation signals according to the algorithm:

$$D=(A(16-C)+CB)/16$$

wherein D is the interpolated colour signal, A and B are signals representing scanned lines mutually delayed one line, and C represents the interpolation coefficient and is a distance between a scanned line and the interpolated colour signal.

26. An optical colour scanner according to claim 18, further comprising second integer line delay means to delay said first colour signal an integer number of lines.

27. An optical colour scanner according to claim 18, further comprising third integer line delay means to receive said second colour signal and to supply said second colour signal as an output signal representing delayed registered pixels.

28. An optical colour scanner according to claim 18, wherein the interpolation coefficient and the length of the second delay are adjusted mutually.

29. An optical colour scanner with a variable line resolution, said scanner collecting information from an original along lines, comprising:
- a line detector comprising a first and a second colour line sensor arranged substantially in parallel and at a mutual distance, that can be measured as a number of gap lines corresponding to a number of lines at the actual line resolution; said colour line sensors registering colour information from lines on the original thereby providing a first and a second colour signal which represent the registered colour information;
- a plurality of signal paths, at least comprising a first and a second signal path; said first signal path comprising:
    - an analog-to-digital converter connected to receive said first colour signal and to convert this signal into a first digital colour signal;
    - a first integer line delay; said integer line delay connected to delay said first digital colour signal a first number of lines and providing a first integer line delayed signal;
    - a first single line delay connected to delay said first integer line delayed signal, thereby providing a second integer line delayed signal; and
    - a first interpolator connected to receive said first integer line delayed signal and connected to receive said second integer line delayed signal; said first interpolator forming a first interpolated colour signal located between said first integer line delayed signal and said second integer line delayed signal, which location is determined by a first interpolation coefficient; said first interpolated colour signal thereby being provided as a first output signal; said second signal path comprising:
    - an analog-to-digital converter connected to receive said second colour signal and to convert said second colour signal into a second digital colour signal;
    - a second single line delay connected to delay said second digital colour signal, thereby providing a one line delayed signal; and
    - a second interpolator connected to receive said one line delayed signal and connected to receive said second digital colour signal; said second interpolator forming a second interpolated colour signal located between said one line delayed digital colour signal and said digital colour signal, which location is determined by a second interpolation coefficient, said interpolated colour signal thereby being provided as a second output signal; said first number of lines being selected according to the number of gap lines, said first interpolation coefficient being freely decideable, and said second interpolation coefficient being adjusted correspondingly such that said second and first output signals are located at a coincident position.

30. An optical scanner according to claim 29, wherein said line detector further comprises a third colour line sensor arranged adjacent to and substantially parallel with said first colour line sensor and having a distance to said first colour line sensor that can be measured as a number of gap lines.

31. An optical scanner according to claim 30, further comprising a third signal path comprising:
- an analog-to-digital converter connected to receive said first colour signal and to convert said colour signal into a third digital colour signal;
- a second integer line delay, connected to delay said digital colour signal a second number of lines, thereby providing a third integer line delayed signal;
- a single line delay connected to delay said third integer line delayed signal, thereby providing a fourth integer line delayed signal; and
- an interpolator connected to receive said third and fourth integer line delayed signals; said interpolator forming an interpolated colour signal located between said third integer line delayed signal and said fourth integer line delayed signal, which interpolated colour signal location is determined by a third interpolation coefficient, said interpolated colour signal thereby being provided as a third output signal.

32. An optical colour scanner with a line resolution, said scanner collecting information from an original, comprising:
- a line detector comprising a set of colour line sensors arranged substantially in parallel and at a mutual distance, said colour line sensors registering colour information from pixels on the original, thereby providing a colour signal for each colour line sensor that represents the registered colour information, at least comprising a first and a second colour signal;

displacement means that is capable of displacing the original and said line detector relative to each other with a selectable feed rate;

first integer line delay means connected to delay said first colour signal;

interpolation means connected to receive the delayed first colour signal and said first colour signal and adapted for calculating interpolated values in response to an interpolation coefficient, thereby estimating colour information between the registered colour information from lines on the original;

said interpolation means being adapted, such that at least a first interpolation coefficient may be adjusted in correspondence with the feed rate, such that said interpolated values are located at a position coincident with a registered pixel represented by means of a sample point in said second colour signal;

taking said interpolated values and said second colour signal as output signals.

\* \* \* \* \*